US007474651B2

(12) United States Patent
Ozawa

(10) Patent No.: US 7,474,651 B2
(45) Date of Patent: Jan. 6, 2009

(54) RADIO WAVE CORRECTION CLOCK

(75) Inventor: Kenji Ozawa, Chiba (JP)

(73) Assignee: SEIKO Precision Inc., Chiba (JP)

( * ) Notice: Subject to any disclaimer, the term of this patent is extended or adjusted under 35 U.S.C. 154(b) by 495 days.

(21) Appl. No.: 10/938,390

(22) Filed: Sep. 10, 2004

(65) Prior Publication Data

US 2005/0099993 A1 May 12, 2005

(30) Foreign Application Priority Data

Sep. 10, 2003 (JP) ............................ 2003-318704

(51) Int. Cl.
*H04J 3/06* (2006.01)

(52) U.S. Cl. ......................... 370/350; 370/503; 368/47; 455/181.1; 327/156

(58) Field of Classification Search ................. 370/350, 370/503; 368/184, 21, 293, 204, 47, 78, 368/46, 10, 108, 51; 455/181.1, 260, 73, 455/83; 327/156
See application file for complete search history.

(56) References Cited

U.S. PATENT DOCUMENTS 4,440,501 A * 4/1984 Schulz ........................ 368/47
6,288,977 B1 * 9/2001 Yoshida et al. ................ 368/47
6,459,657 B1 * 10/2002 Takada et al. ................. 368/46
7,158,449 B2 * 1/2007 Fujimori et al. ............... 368/47
7,288,974 B2 * 10/2007 Ozawa ....................... 327/156

FOREIGN PATENT DOCUMENTS

JP 11-304973 11/1999
JP 2002-082186 3/2002
JP 2002-131456 5/2002

* cited by examiner

*Primary Examiner*—Charles N Appiah
*Assistant Examiner*—Joy K. Contee
(74) *Attorney, Agent, or Firm*—Townsend and Townsend and Crew LLP

(57) ABSTRACT

The code extraction unit extracts time information from a time signal. The block determination unit determines whether the extracted time information is correct by each kind of the time information. The time information collection unit collects time information determined as correct. The time information determination unit performs logic check of the collected time information, and determines whether correct information is collected for all kinds of the time information, and if not collected, stores time information determined as logically correct in a temporary storage unit. If correct information is not collected for all kinds in the time information collection unit, a time information modification unit updates the time information in the time information collection unit by the time information stored in the temporary storage unit. If correct information is collected for all kinds of the time information, the time information determination unit corrects time information retained in a timekeeping unit.

8 Claims, 12 Drawing Sheets

RADIO WAVE CORRECTION CLOCK

CROSS-REFERENCES TO RELATED APPLICATIONS

This patent application claims priority to Japanese Patent Application No. 2003-318704, filed on Sep. 10, 2003.

BACKGROUND OF THE INVENTION

1. Field of the Invention

The present invention relates to a radio wave correction clock which corrects time based on a time calibration signal (standard time and frequency signal) containing a time code.

2. Description of the Related Art

Currently, time calibration signals containing time codes are transmitted from a radio station. As a time calibration signal, time information such as year (the last two digits of a dominical year), hour, minute, etc. is serially transmitted as a binary code in the unit of one frame per minute. Specifically, one bit is represented as a rectangular pulse of 1 Hz, and "1" and "0" are represented by different pulse widths. And each time information piece is represented as a binary code. In some cases, a marker (frame reference) for identifying the start of one-frame data and a marker (frame reference) for identifying the start of each data (block) within a frame are used. In such cases, the markers are represented by pulse widths different from the pulse widths used in the above-described binary code.

A clock which corrects time by receiving a time calibration signal supplies power to its reception circuit for a predetermined time period from a predetermined time, receives a time calibration signal containing time information, and corrects time if it can receive it accurately.

However, such a clock may not be able to fully receive the time information, if the clock is installed in a place where a time calibration signal is hard to receive, or if there are influences of noise.

As a solution to this problem, Unexamined Japanese Patent Application KOKAI Publication No. H11-304973 (Reference 1) discloses a radio wave correction clock which determines received data containing time information such as year, month, day, and time (hour and minute) for each block in order to determine a block which has been received successfully, and continuously receives only a block which has not been received successfully.

Further, Unexamined Japanese Patent Application KOKAI Publication No. 2002-82186 (Reference 2) discloses a radio wave clock which receives block data of year, month, day, and time (hour and minute) during one unit period including a plurality of cycles, sequentially stores blocks which have been successfully received, and regards time information whose blocks have been all successfully received as provisional time information. This radio wave clock performs this process for two unit periods to obtain two pieces of provisional time information, and determines whether time is correct or not by comparing the two pieces of provisional time information.

Furthermore, Unexamined Japanese Patent Application KOKAI Publication No. 2002-131456 (Reference 3) discloses a radio wave clock which stores normal blocks other than error blocks if there are any such error blocks in part of the time information such as hour, minute, etc., and then advances its internal clock. If data obtained at the next reception time coincides with the data of the advanced time, this radio wave clock corrects time based on the received time data.

According to the invention of Reference 1, the block data of year, month, day, and time (hour and minute) which pass the parity check are determined as correct time information. However, since the block data which is first determined as correct is not necessarily correct, time correction might be performed based on an incorrect time.

According to the invention of Reference 2, block data which passes binary detection (detection of whether a bit is "0" or "1") is regarded as correct time information and stored, and is not overwritten in the corresponding one unit period. However, since the block data that is stored first is not necessarily correct, time correction might be performed based on an incorrect time.

According to the invention of Reference 3, block data of year, month, day, and time (hour and minute) in the received data which pass the parity check are regarded as correction time information. However, in a case where either of time information contained in data received first and time information contained in data received next is incorrect, the two times compared with each other do not coincide. Therefore, time correction is not performed.

BRIEF SUMMARY OF THE INVENTION

The present invention was made in view of the above-described circumstance, and an object of the present invention is to provide a radio wave correction clock which can correct time more accurately than conventional.

To achieve the above object, a radio wave correction clock according to a first aspect of the present invention comprises:

a timekeeping unit which includes a timekeeping counter;

a reception unit which receives a time calibration signal;

a designating unit which designates time correction corresponding to a reception area where the time calibration signal is received;

first and second storage units which store time information;

an extraction unit which extracts various kinds of time information from the time calibration signal received by the reception unit;

a first determination unit which determines whether the time information extracted by the extraction unit is correct or not by each of the various kinds of the time information, and stores time information which is determined as correct in the first storage unit;

a second determination unit which performs logic check of each of the various kinds of the time information stored in the first storage unit to determine whether correct information is collected for all of the various kinds of the time information in the first storage unit, and stores correct time information out of the various kinds of the time information stored in the first storage unit in the second storage unit, in a case where the second determination unit determines that correct information is not collected for all of the various kinds of the time information;

a modification unit which modifies the time information stored in the first storage unit based on the time information stored in the second storage unit; and a correction unit which corrects the timekeeping counter of the timekeeping unit based on the various kinds of the time information stored in the first storage unit and designation of time correction corresponding to the reception area, in a case where the second determination unit determines that correct information is collected for all of the various kinds of the time information.

The various kinds of the time information extracted by the extraction unit may include data of minute, hour, serial day number, year, and leap second, and the first determination unit may perform determination of whether the time information is correct or not as to time information of minute, hour, serial day number, year, and leap second.

The various kinds of the time information extracted by the extraction unit may include data of minute and hour, and the first determination unit may perform determination of whether the time information is correct or not as to time information of minute and hour.

The second determination unit may determine whether plural sets of time information have been collected, and may correct the timekeeping counter of the timekeeping unit based on a set of time information which is collected last in a case where determining that plural sets of time information have been collected.

A radio wave correction clock according to a second aspect of the present invention comprises:

a timekeeping unit which includes a timekeeping counter;

a reception unit which receives a time calibration signal;

a designating unit which designates time correction corresponding to a reception area where the time calibration signal is received;

first and second storage units which store time information;

an extraction unit which extracts various kinds of time information from the time calibration signal received by the reception unit;

a first determination unit which determines whether the time information extracted by the extraction unit is correct or not by each of the various kinds of the time information, and stores time information which is determined as correct in the first and second storage units;

a second determination unit which determines whether correct information is collected for all of the various kinds of the time information stored in the first storage unit;

a modification unit which modifies the time information stored in the first storage unit based on the time information stored in the second storage unit, in a case where the second determination unit determines that correct information is not collected for all of the various kinds of the time information; and a correction unit which corrects the timekeeping counter of the timekeeping unit based on the various kinds of the time information stored in the first storage unit and designation of time correction corresponding to the reception area, in a case where the second determination unit determines that correct information is collected for all of the various kinds of the time information.

The various kinds of the time information extracted by the extraction unit may include data of minute, hour, serial day number, year, and leap second, and the first determination unit may perform determination of whether the time information is correct or not as to time information of minute, hour, serial day number, year, and leap second.

The various kinds of the time information extracted by the extraction unit may include data of minute and hour, and the first determination unit may perform determination of whether the time information is correct or not as to time information of minute and hour.

The second determination unit may determine whether plural sets of time information have been collected, and may correct the timekeeping counter of the timekeeping unit based on a set of time information which is collected last in a case where determining that plural sets of time information have been collected.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE INVENTION

The embodiments of the present invention will now be explained with reference to the drawings.

FIRST EMBODIMENT

Figure 1:
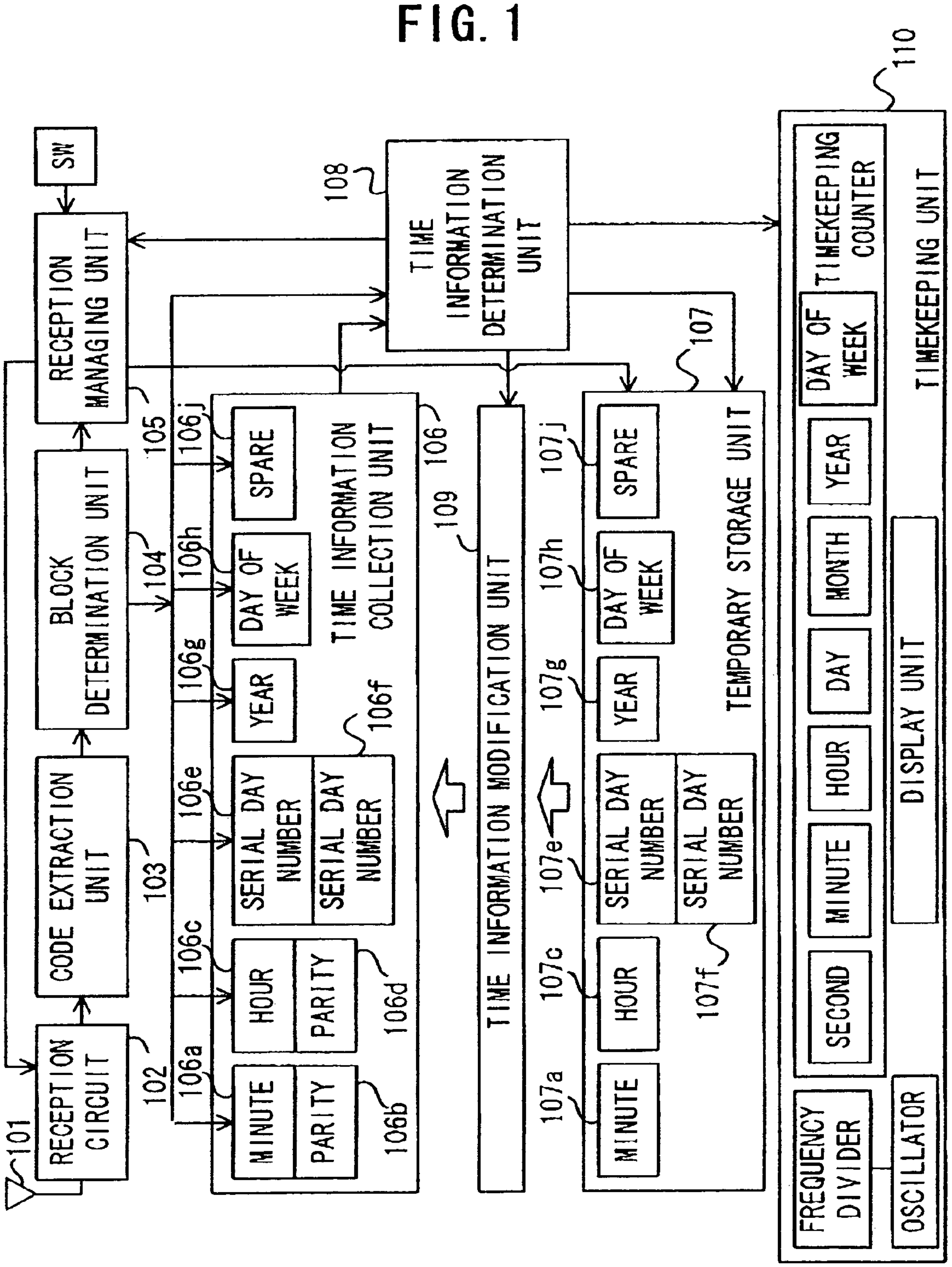
FIG. 1 is a diagram showing an example of configuration of a radio wave correction clock according to a first embodiment of the present invention.

In the first embodiment, explanation will be given to a case where a time calibration signal (standard time and frequency signal) transmitted from a radio station contains data such as minute, minute parity, hour, hour parity, serial day number as counted from January 1, year, day of the week, spare bit, etc. FIG. 1 is a block diagram showing the main configuration of a radio wave correction clock according to the first embodiment of the present invention.

A reception managing unit 105 controls the start and end of reception of a time calibration signal, when a preset reception time comes or when a depression of a correction switch SW is detected. The time calibration signal is received by an antenna 101. A reception circuit 102 amplifies the wave standard signal received by the antenna 101, and detects a time signal having a unit of one frame per minute and representing a bit as a rectangular pulse of 1 Hz, from the amplified signal. A code extraction unit 103 detects the pulse width of the rectangular pulse of 1 Hz detected by the reception circuit 102, and extracts time codes such as binary codes, markers for identifying the start of one-frame data or the start of each data (block) within the frame, etc. A block determination unit 104 detects markers indicating the start of one frame (for example, two continuous markers) from the time codes extracted by the code extraction unit 103, and then converts the binary codes into time information such as hour, minute, etc. based on a format which is set to a time calibration signal. Further, the block determination unit 104 outputs a determination request for determining the time information such as hour, minute, etc., and outputs a timing for correcting a timekeeping counter of a timekeeping unit 110, etc.

A time information collection unit 106 collects and saves (stores) time information output from the block determination unit 104, separately by each kind of time information. A time information determination unit 108 performs correct-incorrect determination of values represented by the time information collected by the time information collection unit 106, performs error detection of minute, hour, etc. by using a parity bit, and waits for necessary time information to be collected. Further, the time information determination unit 108 notifies to the reception managing unit 105 that correction, etc. of time kept by the timekeeping unit 110 is completed successfully. In a case where necessary information is not all collected, the time information determination unit 108 temporarily stores the time information in a temporary storage unit 107, and instructs a time information modification unit 109 to modify the time information. The temporary storage unit 107 stores time information which is determined as correct by the time information determination unit 108. The time information modification unit 109 performs calculation of advancement for the time information stored in the temporary storage unit 107, and also performs modification (interpolation) of the time information. The timekeeping unit 110 comprises an oscillator having a crystal unit or the like, a frequency divider which generates a cycle corresponding to one second by using a cycle of a pulse oscillated by the oscillator, a timekeeping counter which counts second, minute, hour, day, month, year, and day of the week based on the one second signal generated by the frequency divider, and a display unit which displays the values set in the timekeeping counter on an LCD (Liquid Crystal Display) or the like.

Figure 2:
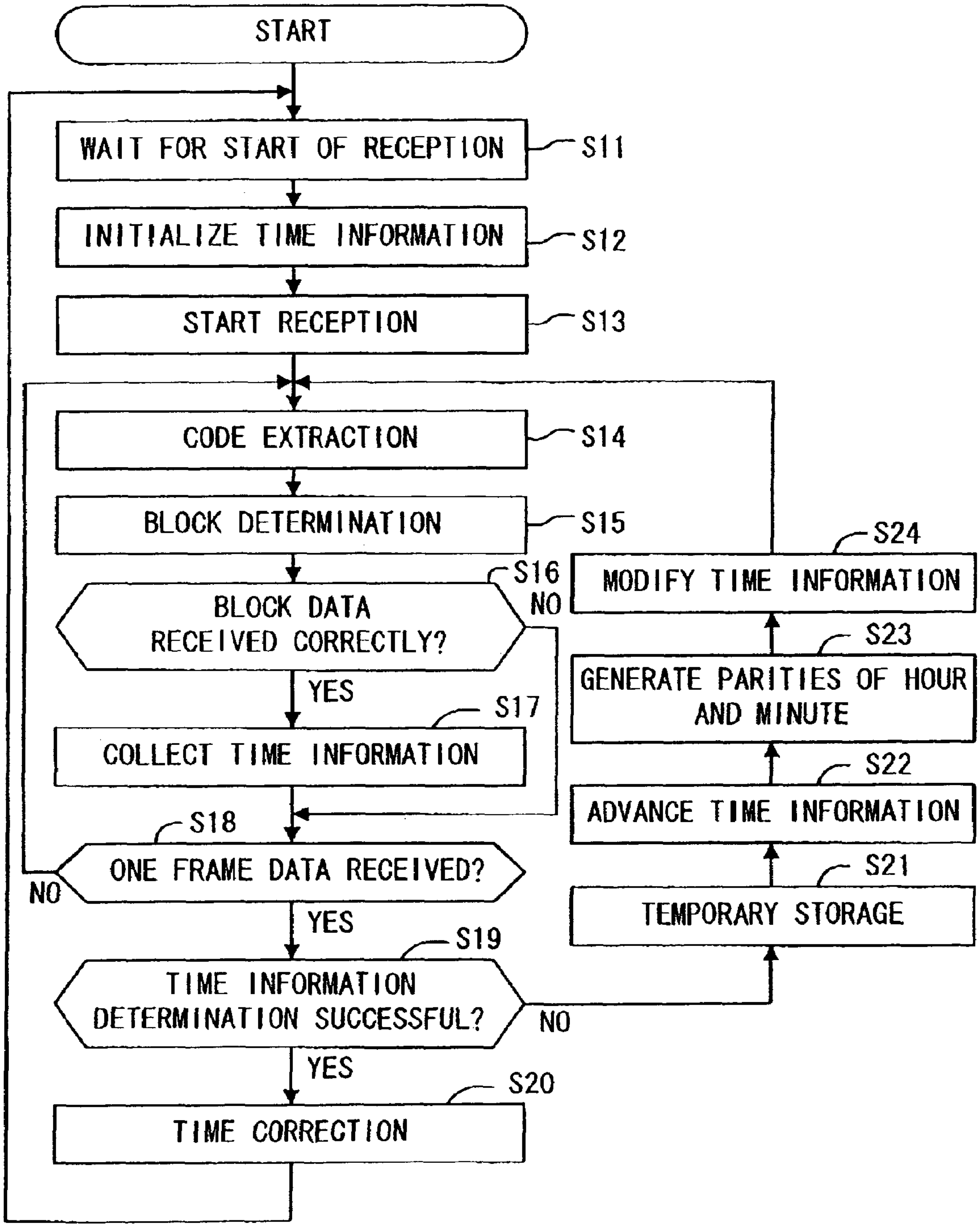
FIG. 2 is a flowchart for explaining a time correction process performed by the radio wave correction clock shown in FIG. 1.

Next, a time correction process performed by the radio wave correction clock according to the first embodiment of the present invention will be specifically explained with reference to a flowchart shown in FIG. 2. This time correction process is repeatedly performed while an effective battery (not shown) is loaded in the radio wave correction clock.

The reception managing unit 105 waits until a preset reception time comes or until depression of the correction switch SW is detected, in a time calibration signal reception start waiting state (step S11).

When the reception time comes or when depression of the correction switch SW is detected, the reception managing unit 105 initializes the time information (step S12), and starts receiving a time calibration signal (step S13). The reception time is pre-stored in the reception managing unit 105. The reception time may be one or a plurality of time/times which is/are set in a day such as 2:00 a.m. or 5:00 a.m., or may be times at regular intervals as counted from 0:00 a.m. such as every three hours. In initialization of the time information, the time information collection unit 106 and the temporary storage unit 107 are initialized by using a code which does not establish time information, i.e., by using initialization code. As an initialization method, a flag indicating that time information has been set may be prepared so that the flag may be erased when initialization is performed.

When reception of a time calibration signal is started in step S12, the reception circuit 102 amplifies the time calibration signal received by the antenna 101, and then detects a rectangular pulse having a unit of one frame per minute and representing one bit by 1 Hz and outputs the detected rectangular pulse to the code extraction unit 103. The code extraction unit 103 detects the pulse width of the detected rectangular pulse. The code extraction unit 103 extracts a time code by determining that the rectangular pulse is a binary code of "1" if the pulse width is 500 ms±100 ms (i.e., 400 ms to 600 ms), determining that the rectangular pulse is a binary code of "0" if the pulse width is 800 ms±100 ms (i.e., 700 ms to 900 ms), and determining that the rectangular pulse is a marker if the pulse width is 200 ms±100 ms (i.e., 100 ms to 300 ms) (step S14). At this time, as to a signal which does not fall within any of the pulse width ranges above or a signal whose rectangular pulse is not 1 Hz, the code extraction unit 103 considers such a signal as having been influenced by a noise or an abrupt interference wave, and processes the signal as a code extraction error. Other than the above-described method for determining the rectangular pulse by setting determination ranges of the pulse width, a method for determining the rectangular pulse by setting a boundary between reference values of pulse width and comparing the detected pulse width with the reference values, may be employed as a method of extracting a time code.

When time codes such as binary codes and markers are input from the code extraction unit 103, the block determination unit 104 detects a frame start timing (for example, two continuous markers), and thereafter starts block determination in which the block determination unit 104 converts the binary codes into time information such as minute, hour, serial day number, year, day of the week, hour parity, minute parity, spare flag, etc. based on the format of time code information set to the time calibration signal, and determines whether or not the block data has been received correctly by determining whether the conversion result is correct or not (step S15).

Block determination in step S15 will now be specifically explained. For example, assume that the format of the time code information of the time calibration signal prescribes that the time information of "minute" is represented by the first to the eighth pulses by BCD (binary coded decimal notation), the value of the tens digit of "minute" is represented by the first to the third pulses of the eight pulses, and the value of the units digit of "minute" is represented by the fifth to eighth pulses (the fourth pulse is discarded). In a case where a binary code "01100001" represented by the first to the eighth pulses is input, the block determination unit 104 converts this binary code into "31" based on the above-described format. In this case, since the conversion result is correct, the block determination unit 104 determines that this block data has been received correctly (step S16: YES), and outputs the time information to the time information collection unit 106 (step S17). Further, for example, in a case where a binary code "01101010" represented by the first to the eighth pulses is input, the value of the tens digit of "minute" (corresponding to the first to the third pulses) is "3", but the value of the units digit (corresponding to the fifth to the eighth pulses) is "10". Therefore, the block determination unit 104 determines that this block data is a reception error. In addition to this case where the block data has a bit pattern which cannot be represented by BCD, also in a case where a part of the binary code to be determined is lost, the block determination unit 104 determines that the block data is a reception error. In a case where block data is determined as an error (step S16: NO), the received data is discarded. The block determination unit 104 also checks other blocks (hour, serial day number, year, day of the week, etc.) in the same manner based on the format of the time code information of the time calibration signal.

The time information which is determined as correct by the block determination unit 104 in step S16 is collected (written) into memories 106*a* to 106*j* prepared for each kind of time information in the time information collection unit 106. Specifically, the block determination unit 104 stores the time information of "minute" in the minute memory 106*a*, the time information of "hour" in the hour memory 106*c*, the time information representing the upper two digits of "serial day number" in the serial day number memory 106*e*, the time information representing the last one digit of "serial day number" in the serial day number memory 106*f*, the time information of "year" in the year memory 106*g*, the time information of "day of the week" in the day of week memory 106*h*, the time information of "leap second" and spare flags in the spare memory 106*j*, and "minute parity" and "hour parity" in the parity memories 106*b* and 106*d* respectively. By determining whether or not the time information set in this manner in the time information collection unit 106 is the initialization code set in step S12, it is possible to determine whether time information has been collected or not. Further, in a case where time information of a certain kind is newly input to the time information collection unit 106, the data in the memory of this kind is updated (overwritten) with the new time information as input.

In a case where it is determined in step S16 that the block data is a reception error or after the time information is collected in step S17, the block determination unit 104 determines whether reception of data for one frame has been completed or not (step S118). Specifically, the block determination unit 104 obtains the binary code of time information of "leap second" represented by the fifty-fourth pulse and determines whether this binary code has been received correctly or not by checking any loss in the binary code. In a case where the binary code of "leap second" has been received correctly, the block determination unit 104 stores the time information of this binary code, and after this, determines that reception of data for one frame has been completed. In a case where reception of data for one frame has not been completed (step S18: NO), the flow returns to step S14. In a case where reception of data for one frame has been completed (step S118: YES), the block determination unit 104 outputs a determination request for determining the time information to the time information determination unit 108. Note that when the block determination unit 104 detects a frame start timing for the next frame and frames thereafter, it notifies the detected frame start timing to the time information determination unit 108. The frame start timing detected for the next frame and frames thereafter is used as a timing for correcting time kept by the timekeeping unit 110, as will be described later.

When the determination request for determining the time information is input from the block determination unit 104, the time information determination unit 108 performs determination of the time information (step S19). In this determination of the time information, the time information determination unit 108 refers to the time information set in each memory of the time information collection unit 106, and performs determination of whether the value of each kind of the time information is within a normal range content-wise (whether each kind of the time information is established logically) and performs parity check, to determine whether correct time information has been collected for all kinds of the time information. Specifically, as to the time information of "minute", the time information determination unit 108 performs bit error detection of BCD stored in the minute memory 106*a* and the minute parity stored in the parity memory 106*b*, and checks whether the value set in the minute memory 106*a* is within the range of 00 to 59. As to the time information of "hour", the time information determination unit 108 performs bit error detection of BCD stored in the hour memory 106*c* and the hour parity stored in the parity memory 106*d*, and checks whether the value set in the hour memory 106*c* is within the range of 00 to 23. As to the time information of "year", the time information determination unit 108 checks whether the value set in the year memory 106*g* is within the range of 00 to 99. As to the time information of "day of the week", the time information determination unit 108 checks whether the value set in the day of week memory 106*h* is within the range of 0 to 6. As to the time information of "serial day number", the time information determination unit 108 firstly performs a first check for checking whether the value set in the serial day number memory 106*e* is within the range of 00 to 36 and whether the value set in the serial day number memory 106*f* is within the range of 0 to 9, and then performs a second check for checking whether the value of "serial day number" having three digits made up by combining the value (the upper two digits of "serial day number") set in the serial day number memory 106*e* and the value (the last one digit of "serial day number") set in the serial day number memory 106*f* is within the range of 1 to 366. At this time, only either one of the first and second checks may be performed. Further, if the year in question is a common year (non-leap year), the time information determination unit 108 further checks whether the value of the time information of "serial day number" is equal to or smaller than 365. Whether the year in question is a leap year or not may be determined by using, for example, information contained in the time calibration signal, or by the time information determination unit 108 performing a predetermined calculation regarding the value of the time information of "year" (for example, calculation for checking whether the value set for "year" can be divided by 4 and whether this value is any other than 00, etc.). Then, in a case where parity check of "minute" and "hour" results in success and the values of the time information of all kinds are within the normal range, the time information determination unit 108 determines that the time information of all kinds is correct, that is, determines that correct information is collected for all kinds of the time information (step S19: YES), and advances the value of "minute" by 1 (adds 1 to the value set n the minute memory 106*a*). Then, by the time information determination unit 108 obtains month and day from the value of year and the three-digit serial day number stored in the time information collection unit 106. Then, by using the obtained values of month and day and the values set in the memories of year, day of the week, hour, and minute in the time information collection unit 106, the time information determination unit 108 corrects respective corresponding values of the timekeeping counter of the timekeeping unit 110 (step S20). Then, the time information determination unit 108 resets the value of "second" in the timekeeping counter of the timekeeping unit 110 to "00 second" in response to notification of a frame start timing output from the block determination unit 104. As a result, time kept by the timekeeping unit 110 is corrected to the time represented by the time calibration signal.

For example, in a case where the received data (data set in the memories) represent that "year"=03, the upper two digits of "serial day number"=20, the last one digit of "serial day number"=5, "day of the week"=4, "hour"=10, and "minute"=31, the correction data (data to be set in the timekeeping counter) show that "year"=03, "month"=7, "day"=24, "day of the week"=4 (displayed as "Thursday" by the display unit), "hour"=10, "minute"=32, and "second"=00. In this process of correcting the timekeeping unit 110, the updating movement of the timekeeping counter may be stopped before the timekeeping counter is set to the corrected values, and the updating movement may be resumed at the frame start timing. Further, since the time information of "day of the week" can be calculated from year, month, and day, it may be removed from the target of time information collection and time information determination.

When time correction is completed, the time information determination unit 108 notifies the completion to the reception managing unit 105. When receiving the notification, the reception managing unit 105 stops the reception operation of the reception circuit 102 to stop receiving the time calibration signal, and returns to the waiting state to wait for the reception time to come (step S11).

In a case where determining that the time information of all kinds is not correct as a result of determining the time information (step S19: NO), the time information determination unit 108 temporarily stores the time information of only the kinds that are determined as correct in the temporary storage unit 107 (step S21). As such a case where correct information is not collected for all kinds of the time information, a case will be considered where data of "minute", "year", the upper two digits of "serial day number", "day of the week", and spare bit have been correctly received, but data of "hour" is determined as an error because of partial bit loss and data of the last one digit of "serial day number" is determined as an error because the received bit pattern thereof is "1101" which cannot be represented by BCD. In this case, the time information of "minute" is stored in the minute memory 107*a* of the temporary storage unit 107, the time information of the upper two digits of "serial day number" is stored in the serial day number memory 107*e*, the time information of "year" is stored in the year memory 107*g*, the time information of "day of the week" is stored in the day of week memory 107*h*, and the spare bit is stored in the spare memory 107*j*.

When the time information is temporarily stored in the temporary storage unit 107, the time information modification unit 109 advances the time information set in the temporary storage unit 107 (step S22). Specifically, the time information modification unit 109 adds 1 to the value of the time information of "minute". In a case where the value of the time information of "minute" becomes 60 as a result of the addition, "minute" should be carried. Therefore, a value "00" is set as the value of "minute" and a value "1" is added to the value of "hour". Likewise, the time information modification unit 109 performs carry determination in the order of "hour", "serial day number", "day of the week", and "year". If there occurs a need of carrying, the time information modification unit 109 performs necessary processes (for example, setting the first value of the range of values which can be taken by the time information of each kind as the value of the time information of each kind, and adding 1 to the value of the time information in the next order). In this process, since time information that has not been received remains as the initialization code which is set in the initialization process of step S12, the value of such time information may be advanced after it is replaced by a value "00", or may be removed from the target of advancement. In a case where time information that has not been received is also advanced, "00" may be set as the initialization code of such time information in the initialization process of step S12, and thus the replacement process may be omitted.

After the advancement of the time information is completed, the time information modification unit 109 generates parity bits of "minute" and "hour" based on the advanced time information (step S23). For example, if the value of the time information of "minute" becomes "32" after advancement, this value will become "01100010" if converted into a binary code by BCD. The number of "1" included in this binary code is 3. Therefore, a minute parity that makes the sum of the number of "1" an even number is "1". By generating this parity bit, even in a case where the next frame is received but the parity bit in this next frame results in a reception error, it is possible to detect the bit error by using the generated parity bit.

When generation of the parity bits is completed, the time information modification unit 109 stores the time information of each kind in the time information collection unit 106 by using the generated parity bits and the data stored in the temporary storage unit 107 (modification of the time information) (step S24). This modification process will be explained in detail by employing the above example. As to the time information of "minute", the value "32" set in the minute memory 107*a* of the temporary storage unit 107 and the generated parity bit "1" are stored in the minute memory 106*a* and minute parity memory 106*b* of the time information collection unit 106. Since the time information of "hour" has not been received, the initialization code is stored in the time information collection unit 106. At this time, a value "0" may be provisionally stored in the hour parity memory 106*d*. As to the time information of the upper two digits of "serial day number", the value "20" set in the serial day number memory 107*e* of the temporary storage unit 107 is stored in the serial day number memory 106*e* of the time information collection unit 106. Since the time information of the last one digit of "serial day number" has not been received, the initialization code is stored in the time information collection unit 106. As to the time information of "year", the value "03" set in the year memory 107*g* of the temporary storage unit 107 is stored in the year memory 106*g* of the time information collection unit 106. As to the time information of "day of the week", the value "4" set in the day of week memory 107*h* of the temporary storage unit 107 is stored in the day of week memory 106*h* of the time information collection unit 106. As to the spare bit, the value "03" set in the spare memory 107*j* of the temporary storage unit 107 is stored in the spare memory 106*j* of the time information collection unit 106.

When the modification of the time information is completed, the flow returns to step S14, and the above-described steps S14 to S18 will be performed for a frame newly received.

Subsequently to the above example, a case will be explained where block determination of a newly received frame results in success as to "minute", "hour", the last one digit of "serial day number", "year", and spare bit, and results in error as to the upper two digits of "serial day number" and "day of the week". In this case, the time information of the kinds whose blocks are determined as having been received correctly ("minute", "hour", "the last one digit of "serial day number", "year", and spare bit) is stored in the corresponding memory in the time information collection unit 106. As to "minute", "the last one digit of "serial day number", "year", and spare bit among the kinds of the time information to be newly stored, the values stored before in the memories of these kinds are kept in these memories. Therefore, the values kept in these memories are overwritten with the new values. Then, in determination of the time information (step S19), the time information collected in the time information collection unit 106 is determined. In the present example, correct-incorrect determination is performed on the time information of minute "32", hour "10", the last one digit of serial day number "5", year "03", and spare bit collected from the frame received this time, and on the time information of the upper two digits of serial day number "20" and day of the week "4" collected from the frame received before. In a case where the time information of these kinds is all correct (step S19: YES), the time information determination unit 108 advances the value of "minute" by 1 minute, and calculates "month" and "day" from the value of "year" and the three-digit serial day number. Then, by using the obtained values of "month" and "day" and the values set in the memories of "year", "day of the week", "hour" and "minute", the time information determination unit 108 corrects the corresponding values of the timekeeping counter of the timekeeping unit 110, and resets the value of "second" in the timekeeping counter of the timekeeping unit 110 to "00" second in response to notification of a frame start timing (step S20).

Even if correct information cannot be collected for all kinds of the time information by reception of one frame, by repeating the processes of code extraction (step S14) to time information determination (step S19) and the processes of temporary storage (step S21) to time information modification (step S24) until correct information is collected for all kinds of the time information, it is possible to obtain all kinds of the time information that are received correctly.

SECOND EMBODIMENT

Next, the second embodiment of the present invention will be explained. The second embodiment is different from the first embodiment in that according to the second embodiment, time information output from the block determination unit is stored in the time information collection unit and in the temporary storage unit.

Figure 3:
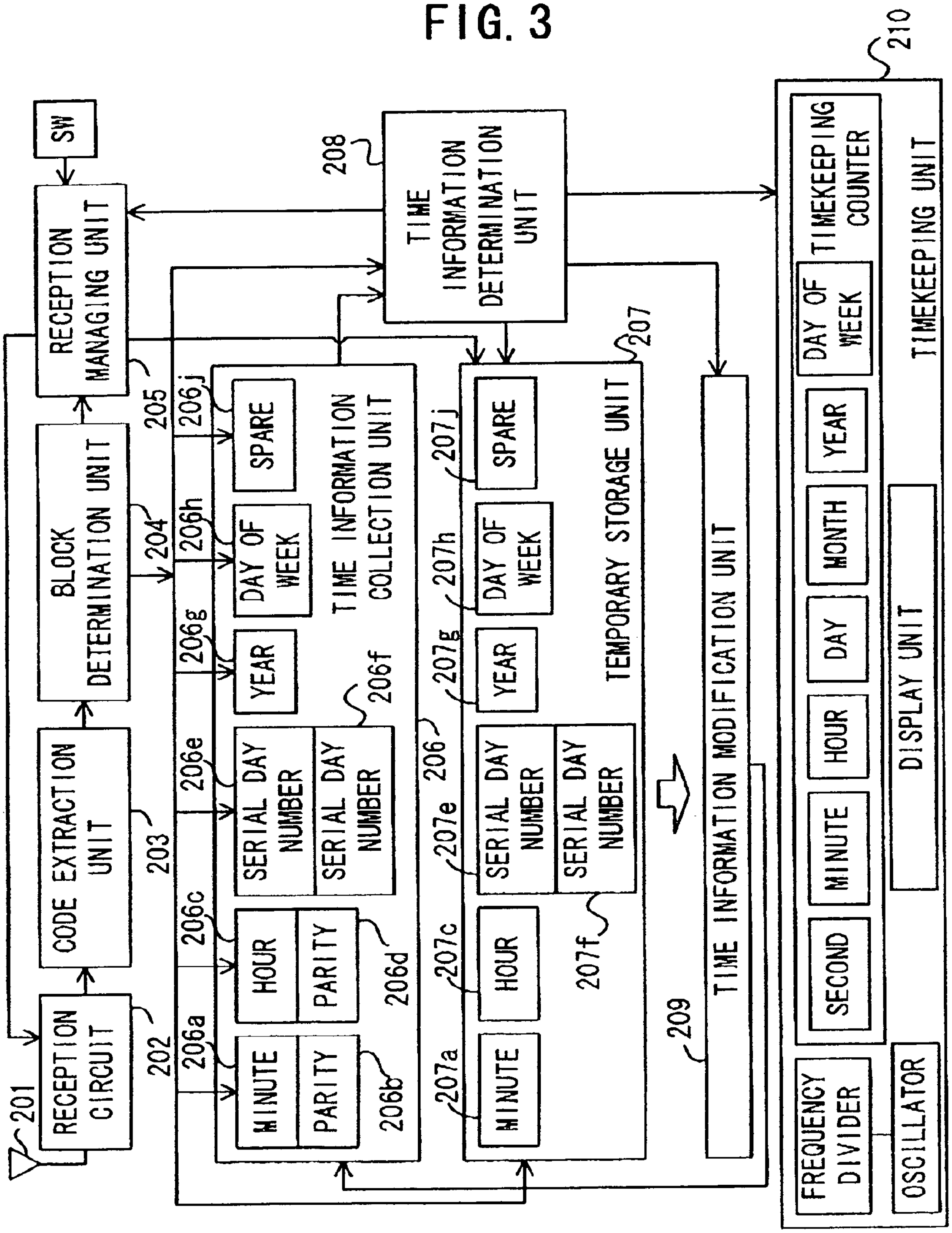
FIG. 3 is a diagram showing an example of configuration of a radio wave correction clock according to a second embodiment of the present invention.

FIG. 3 is a block diagram showing the main configuration of a radio wave correction clock according to the second embodiment of the present invention.

The antenna 201, the reception circuit 202, the code extraction unit 203, the reception managing unit 205, and the timekeeping unit 210 have the same function and configuration as those of the antenna 101, the reception circuit 102, the code extraction unit 103, the reception managing unit 205, and the timekeeping unit 110 in the first embodiment.

The block determination unit 204 detects markers indicating the start of one frame (for example, two continuous markers) from time codes extracted by the code extraction unit 203, then performs block determination by converting binary codes into time information such as hour, minute, et. based on a format which is set to a time calibration signal (standard time and frequency signal), and stores time information that is determined as correct in the tine information collection unit 206 and in the temporary storage unit 207. Further, the block determination unit 204 outputs a determination request for requesting the time information determination unit 208 to determine the time information, and a timing for correcting the timekeeping counter of the timekeeping unit 210.

The time information collection unit 206 and the temporary storage unit 207 save (store) the time information which is determined as correct and output from the block determination unit 204, separately by each kind of time information. The time information collection unit 206 and the temporary storage unit 207 store the latest data for the time information as such latest data is obtained. The time information determination unit 208 waits until necessary time information is all collected in the time information collection unit 206. When all collected, the time information determination unit 208 notifies to the reception managing unit 205 that correction of time, etc. in the timekeeping unit 210 has been successfully completed. In a case where necessary time information is not all collected, the time information determination unit 208 instructs the time information modification unit 209 to modify the time information. The time information modification unit 209 performs calculation of advancement for the time information stored in the temporary storage unit 207, and also performs modification (interpolation) of the time information.

Figure 4:
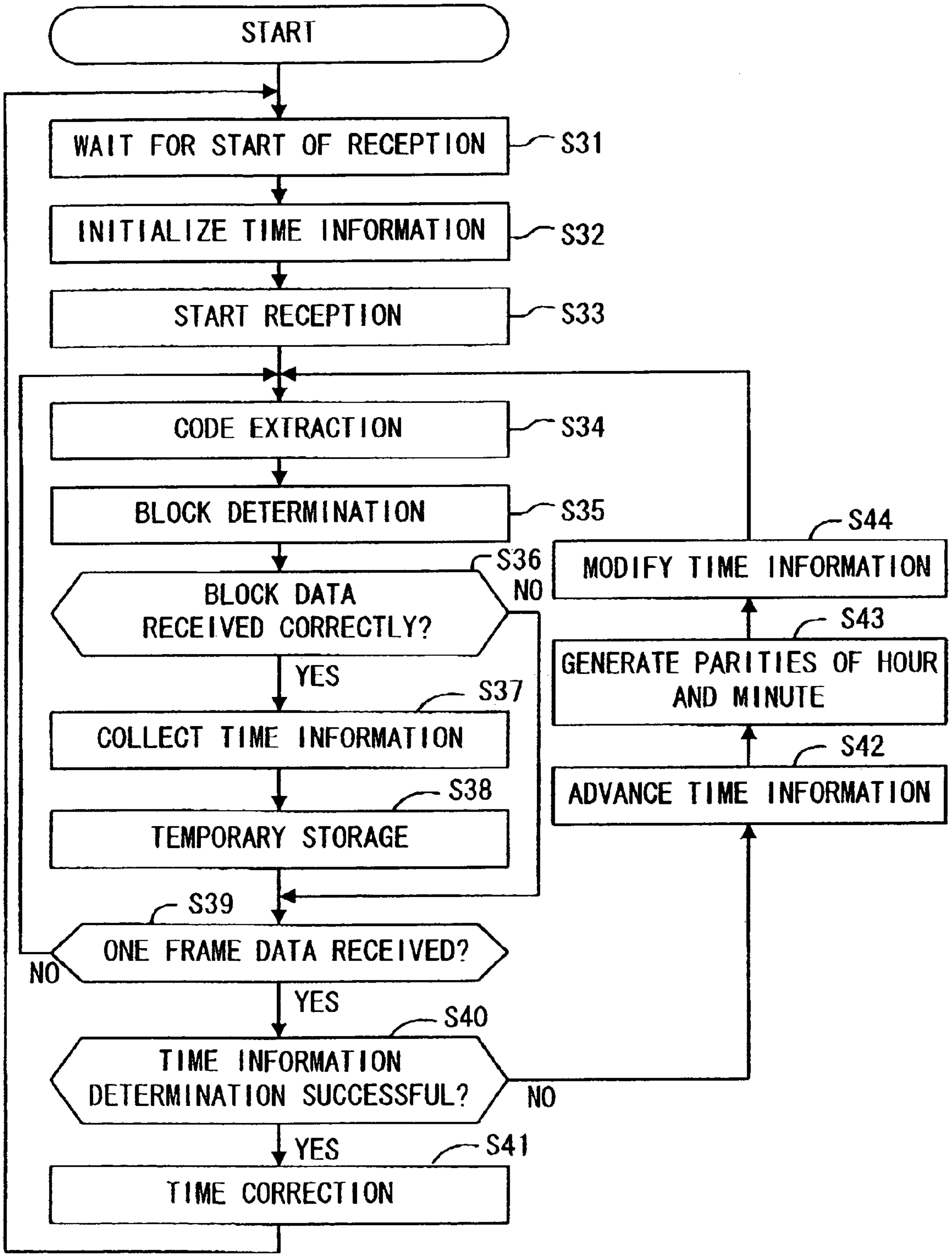
FIG. 4 is a flowchart for explaining a time correction process performed by the radio wave correction clock shown in FIG. 3.

Next, with reference to a flowchart shown in FIG. 4, a time correction process performed by the radio wave correction clock according to the second embodiment of the present invention will be specifically explained. This time correction process is repeatedly performed while an effective battery (not shown) is loaded in the radio wave correction clock.

The reception managing unit 205 waits until a preset reception time comes or a depression of a correction switch SW is detected, in a time calibration signal reception start waiting state (step S31).

When the reception time comes or a depression of the correction switch SW is detected, the reception managing unit 205 initializes the time information (step S32), and starts receiving a time calibration signal (step S33). The reception time is pre-stored in the reception managing unit 205.

When reception of a time calibration signal is started in step S32, the reception circuit 202 amplifies the time calibration signal received by the antenna 201, detects a rectangular pulse having a unit of one frame per minute and representing one bit by 1 Hz, and outputs the detected rectangular pulse to the code extraction unit 203. The code extraction unit 203 detects the pulse width of the detected rectangular pulse. The code extraction unit 103 extracts a time code by determining that the rectangular pulse is a binary code of "1" if the pulse width is 500 ms±100 ms (i.e., 400 ms to 600 ms), determining that the rectangular pulse is a binary code of "0" if the pulse width is 800 ms±100 ms (i.e., 700 ms to 900 ms), and determining that the rectangular pulse is a marker if the pulse width is 200 ms±100 ms (i.e., 100 ms to 300 ms) (step S34).

When time codes such as binary codes, markers, etc. are input from the code extraction unit 203, the block determination unit 204 detects a frame start timing, and thereafter converts the binary codes into time information such as minute, hour, serial day number, year, day of the week, hour parity, minute parity, spare flag, etc. based on a format of time code information set to the time calibration signal. Then, the block determination unit 204 performs block determination for determining whether each block data has been received correctly, by determining whether the result of conversion is correct or not (step S35). This block determination includes determination of whether the time information obtained based on the format of time code information set to the time calibration signal is correct formally, parity error detection, check of the range of the value of the time information (logic check), etc. The specific contents of these checks are the same as those in the first embodiment. For example, as to the time information of "minute", the block determination unit 204 obtains a binary code corresponding to "minute" based on the format of the time code information, and determines whether or not the obtained binary code can be represented as BCD and whether or not the binary code is partially lost. In a case where these determinations result in success, the block determination unit 204 obtains minute parity based on the format of the time code information, and performs error detection by using the binary code of "minute" and the minute parity. In a case where no error is detected by this error detection, the block determination unit 204 checks whether the value of the time information is within the range of 00 to 59. As to the time information of "hour", the block determination unit 204 also determines whether the binary code is correct formally, performs error detection and value range check (whether the value is within the range of 00 to 23). As to the time information of "year", the block determination unit 204 determines whether the binary code is correct formally, and performs value range check (whether the value is within the range of 00 to 99). As to the time information of "day of the week", the block determination unit 204 determines whether the binary code is correct formally, and performs value range check (whether the value is within the range of 0 to 6). As to the time information of the upper two digits of "serial day number", the block determination unit 204 determines whether the binary code is correct formally, and performs value range check (whether the value is within the range of 00 to 36). As to the time information of the last one digit of "serial day number", the block determination unit 204 determines whether the binary code is correct formally, and performs value range check (whether the value is within the range of 0 to 9). In a case where error is detected in any checks performed for the respective kinds of the time information, the block determination unit 204 determines that the block data of the time information has not been received correctly, and discards the time information.

In a case where determining that the block data has been received correctly (step S36: YES), the block determination unit 204 collects (writes) the time information in the memories 206*a* to 206*j* prepared for the respective kinds of the time information in the time information collection unit 206 (step S37), and temporarily stores (writes) the time information in the memories 207*a* to 207*j* prepared for the respective kinds of the time information in the temporary storage unit 207 (step S38). Data of "minute" and "hour" may be temporarily stored (written) in the memories 207*a* and 207*c* after the parities are received, since the parities are received after "serial day number". For example, in the time information collection unit 206, the block determination unit 204 stores the time information of "minute" in the minute memory 206*a*, the time information of "hour" in the hour memory 206*c*, the time information of the upper two digits of "serial day number" in the serial day number memory 206*e*, the time information of the last one digit of "serial day number" in the serial day number memory 206*f*, the time information of "year" in the year memory 206*g*, the time information of "day of the week" in the day of week memory 206*h*, the time information of "leap second" and spare flag in the spare memory 206*j*, and the minute parity and hour parity in the parity memories 206*b* and 206*d* respectively. Likewise, in the temporary storage unit 207, the block determination unit 204 stores the respective kinds of the time information in the corresponding memories 207*a* to 207*j*.

In a case where it is determined in step S36 that any block data results in reception error (step S36: NO) or after the time information is temporarily stored in step S38, the block determination unit 204 determines whether reception of data for one frame has been completed or not (step S39). The specific content of the process in step S39 is the same as that in the first embodiment. In a case where reception of data for one frame has not been completed (step S39: NO), the flow returns to step S34. In a case where reception of data for one frame has been completed (step S39: YES), the block determination unit 204 outputs a determination request for determining the time information to the time information determination unit 208. When the block determination unit 204 detects a frame start timing for the next frame and frames thereafter, it notifies the detected frame start timing to the time information determination unit 208. The detected frame start timing for the next frame and frames thereafter is used as a timing for correcting time kept by the timekeeping unit 210, as will be described later.

When the determination request for determining the time information is input from the block determination unit 204, the time information determination unit 208 starts determination of the time information (step S40). In this determination of the time information, the time information determination unit 208 determines whether correct time information is collected in all of the memories 206*a* to 206*j* of the time information collection unit 206. At this time, the time information determination unit 208 may also perform the check of whether the value of the three-digit serial day number made up by combining the value set in the serial day number memory 206*e* (the upper two digits of "serial day number") and the value set in the serial day number memory 206*f* (the last one digit of "serial day number") is within the range of 1 to 366. In a case where determining that correct time information is collected in all the memories of the time information collection unit 206 (step S40: YES), the time information determination unit 208 advances the value of "minute" by 1 (adds 1 to the value set in the minute memory 206*a*). Further, the time information determination unit 208 calculates "month" and "day" from the value of "year" and the three-digit serial day number stored in the time information collection unit 206. Then, by using the calculated values of "month" and "day" and the values set in the memories of "year", "day of the week", "hour", and "minute" in the time information collection unit 206, the time information determination unit 208 corrects the corresponding values in the time keeping counter of the timekeeping unit 210 (step S41). Then, the time information determination unit 208 resets the value of "second" kept by the time keeping counter of the timekeeping unit 210 to 00 second in response to the notification of a frame start timing output from the block determination unit 204. As a result, time kept by the timekeeping unit 210 is corrected to time indicated by the time calibration signal.

When correction of time is completed, the time information determination unit 208 notifies the completion to the reception managing unit 205. When receiving the notification, the reception managing unit 205 stops the reception operation of the reception circuit 202 to finish receiving the time calibration signal, and returns to the waiting state to wait for the reception time to come (step S31).

In a case where determining that correct time information is not collected in all the memories of the time information collection unit 206 as a result of determining the time information (step S40: NO), the time information determination unit 208 notifies this determination result to the time information modification unit 209. The time information modification unit 209 advances the time information set in the temporary storage unit 207 (step S42). This process of advancement is the same as that in the first embodiment.

After advancing the time information, the time information modification unit 209 generates parity bits for "hour" and "minute" from the advanced time information (step S43). This process of generating parity bits is the same as that in the first embodiment.

When parity bits are generated, the time information modification unit 209 stores the time information of each kind in the time information collection unit 206 by using the generated parity bits and the data stored in the temporary storage unit 207 (modification of the time information) (step S44). Specifically, the time information modification unit 209 stores the time information stored in the memories 207*a* and 207*j* of the temporary storage unit 207, in the memories 206*a* to 206*j* of the time information collection unit 206.

When modification of the time information is completed, the flow returns to step S34, so that the processes of the above-described steps S34 to S38 are performed for a frame newly received.

A case will be explained where block determination of the newly received frame results in success as to "minute", "hour", the last one digit of "serial day number", "year", and spare bit, and results in error as to the upper two digits of "serial day number" and "day of the week". In this case, the time information whose block is determined as having been received correctly ("minute", "hour", the last one digit of "serial day number", "year", and spare bit) is stored in the corresponding memory of the time information collection unit 206 and temporary storage unit 207. Among these kinds of the time information to be newly stored, the time information whose value stored before is kept in the corresponding memory is overwritten with the new value. Then, in determination of the time information (step S40), the time information collected in the time information collection unit 206 is determined. In a case where correct time information is stored in all the memories of the time information collection unit 206 (step S40: YES), the time information determination unit 208 advances the value of "minute" by 1, and calculates "month" and "day" from the value of "year" and the three-digit serial day number. By using the calculated values of "month" and "day" and the values set in the memories of "year", "day of the week", "hour", and "minute", the time information determination unit 208 corrects the corresponding values in the timekeeping counter of the timekeeping unit 210, and resets the value of "second" in the timekeeping counter of the timekeeping unit 210 to 00 second in response to notification of a frame start timing (step S41).

Therefore, even if correct time information is not collected in all the memories of the time information collection unit 206 by reception of one frame, by repeating the processes of code extraction (step S34) to time information determination (step S40) and the processes of time information advancement (step S42) to time information modification (step S44) until correct time information is collected in all the memories of time information correction unit 206, it is possible to obtain all kinds of the time information that are received correctly.

THIRD EMBODIMENT

In the third embodiment, a radio wave clock which receives and processes a time calibration signal on which a time code having a different format from that of the time code of the first embodiment is embedded, and which corresponds to the first embodiment will be explained. The time calibration signal according to the present embodiment contains data of minute, hour, serial day number, year, leap second, etc.

Figure 5:
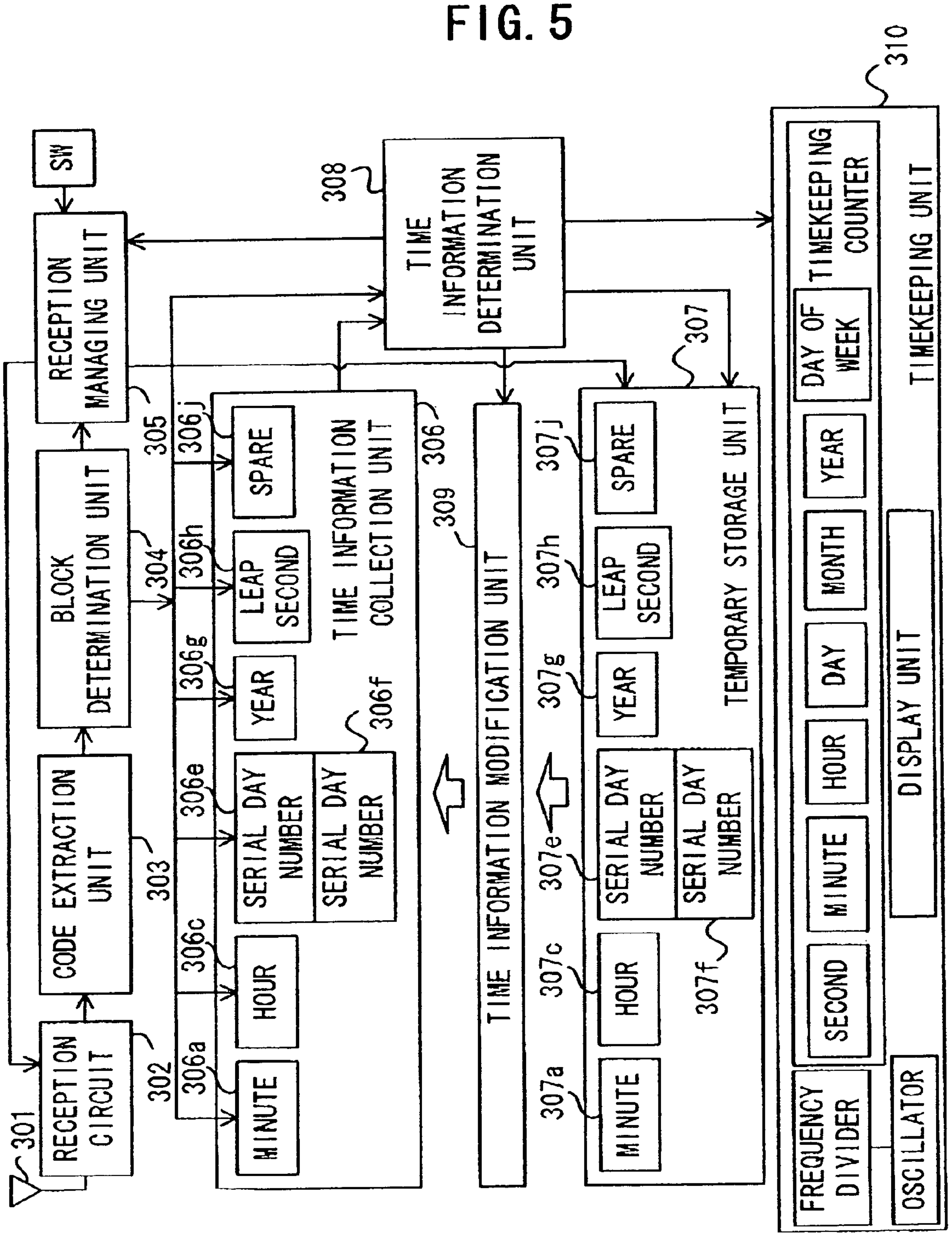
FIG. 5 is a diagram showing an example of configuration of a radio wave correction clock according to a third embodiment of the present invention.

FIG. 5 is a block diagram showing the main configuration of the radio wave correction clock according to the third embodiment of the present invention. The antenna 301, the reception circuit 302, the code extraction unit 303, the block determination unit 304, the reception managing unit 305, the time information collection unit 306, the temporary storage unit 307, the time information determination unit 308, the time information modification unit 309, and the timekeeping unit 310 of the radio wave correction clock according to the present embodiment have the same function and configuration as those of the first embodiment, except the differences to be described below.

The block determination unit 304 detects markers indicating the start of one frame from time codes extracted by the code extraction unit 303, and thereafter converts binary codes into time information of "minute", "hour", "serial day number", "year", "leap second", etc. based on a format which is set to the time calibration signal. The time information collection unit 306 collects and saves (stores) the time information output from the block determination unit 304, separately by the respective kinds of the time information ("minute", "hour", "serial day number", "year", "leap second", etc.). The temporary storage unit 307 saves (stores) time information which is determined as correct by the time information determination unit 308, separately by the respective kinds of the time information ("minute", "hour", "serial day number", "year", "leap second", etc.). Further, according to the present embodiment, data of minute parity and hour parity are not received. Therefore, the time information determination unit 308 does not perform error detection using hour parity and minute parity.

Figure 6:
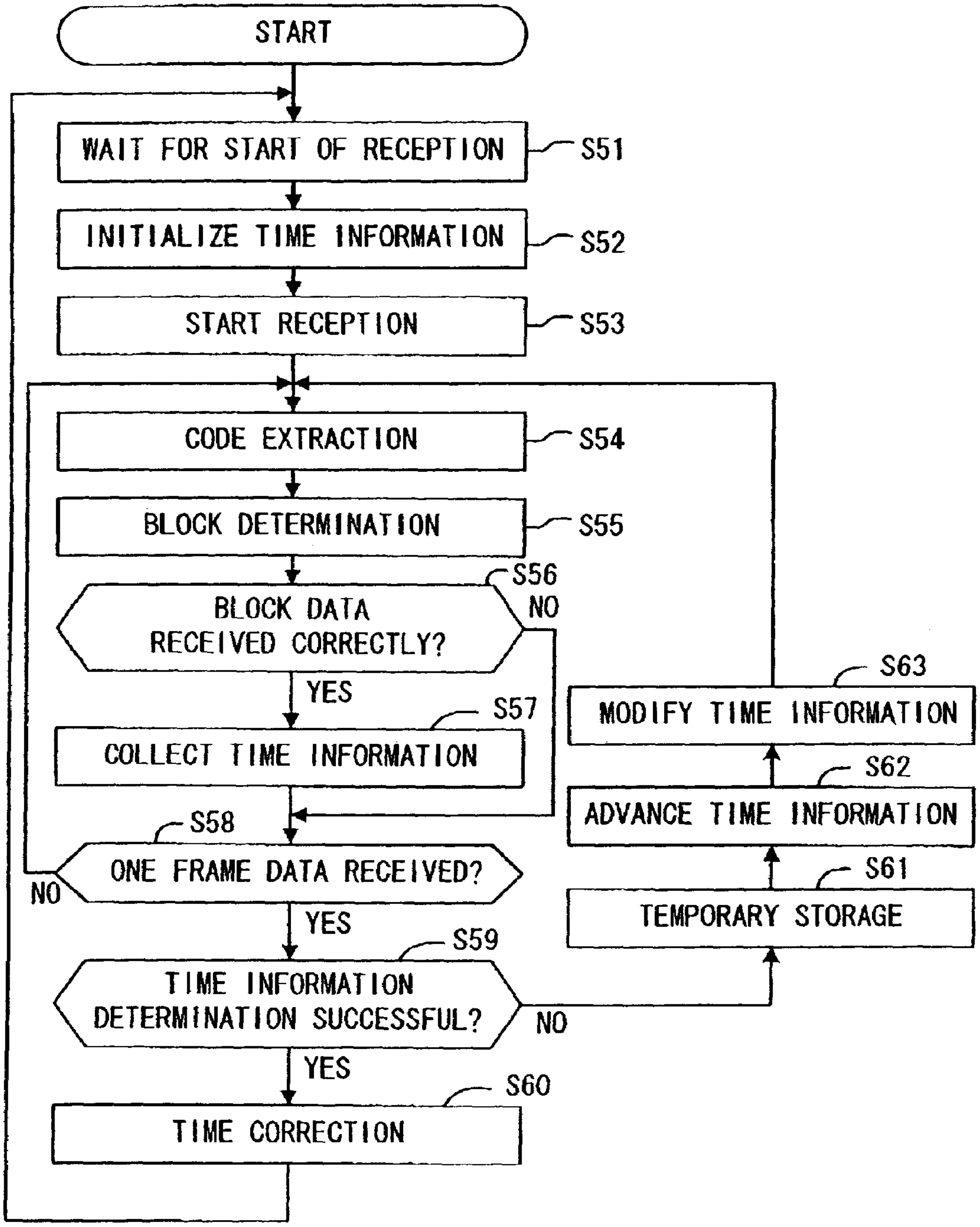
FIG. 6 is a flowchart for explaining a time correction process performed by the radio wave correction clock shown in FIG. 5.

Next, the time correction process performed by the radio wave correction clock according to the third embodiment of the present invention will be specifically explained with reference to a flowchart shown in FIG. 6.

The reception managing unit 305 waits until a preset reception time comes or a depression of the correction switch SW is detected, in a time calibration signal reception start waiting state (step S51).

When the reception time comes or a depression of the correction switch SW is detected, the reception managing unit 305 initializes the time information (step S52), and starts receiving the time calibration signal (step S53). When reception of the time calibration signal is started in step S53, the reception circuit 302 amplifies the time calibration signal received by the antenna 301, detects a rectangular pulse having a unit of one frame per minute and representing one bit by 1 Hz, and outputs the detected rectangular pulse to the code extraction unit 303. The code extraction unit 303 detects the pulse width of the detected rectangular pulse. The code extraction unit 303 extracts a time code by determining that the rectangular pulse is a binary code of "1" if the pulse width is 500 ms±100 ms (i.e., 400 ms to 600 ms), determining that the rectangular pulse is a binary code of "0" if the pulse width is 200 ms±100 ms (i.e., 100 ms to 300 ms), and determining that the rectangular pulse is a frame reference or a position marker if the pulse width is 800 ms±100 ms (i.e., 700 ms to 900 ms) (step S54).

When time codes such as binary codes, markers, etc. are input from the code extraction unit 303, the block determination unit 304 detects a frame start timing, and thereafter obtains block data (time information) of "minute", "hour", "serial day number", "year", "leap second", a condition flag (indicating summer time, forenotice for leap year and leap second), etc. from the binary codes, based on the format of the time code information set to the time calibration signal, and starts block determination for determining each block data has been received correctly (step S55). The process of block determination is the same as that of the first embodiment, and the block determination unit 304 determines whether each bit pattern is correct or not by checking whether the binary code of each obtained block data conforms with the expressive form of BCD.

In a case where determining that the block data has been received correctly (step S56: YES), the block determination unit 304 outputs the time information to the corresponding memory of the time information collection unit 306 (step S57). Specifically, the block determination unit 304 stores the tine information of "minute" in the minute memory 306*a*, the time information of "hour" in the hour memory 306*c*, the time information of the upper two digits of "serial day number" in the serial day number memory 306*e*, the time information of the last one digit of "serial day number" in the serial day number memory 306*f*, the time information of "year" in the year memory 306*g*, the time information of "leap second" in the leap second memory 306*h*, and condition flags of summer time and forenotice for leap year and leap second in the spare memory 306*j*.

In a case where it is determined in step S56 that any block data results in reception error or after the time information is collected in step S57, the block determination unit 304 determines whether reception of data for one frame has been completed or not (step S58). Specifically, the block determination unit 304 acquires a summer time flag represented by the fifty-eighth pulse of the received frame and determines whether this summer time flag has been received correctly by checking any loss in the binary code. In a case where the summer time flag has been received correctly, the block determination unit 304 stores the summer time flag in the time information collection unit 306. When the storage is completed, the block determination unit 304 determines that reception of data for one frame has been completed. In a case where reception of data for one frame has not been completed (step S58: NO), the flow returns to step S54. In a case where reception of data for one frame has been completed (step S58: YES), the block determination unit 304 outputs a determination request for determining the time information to the time information determination unit 308.

When the determination request for determining the time information is input from the block determination unit 304, the time information determination unit 308 performs determination of the time information (step S59). In this determination of the time information, the time information determination unit 308 refers to the time information set in each memory of the time information collection unit 306, performs determination of whether the value of each kind of the time information is within a normal range content-wise (whether each kind of the time information is established logically), and determines whether correct time information is collected in all the memories of the time information collection unit 306. Specifically, as to the time information of "minute", the time information determination unit 308 determines whether the value set in the minute memory 306*a* is within the range of 00 to 59. As to the time information of "hour", the time information determination unit 308 determines whether the value set in the hour memory 306*c* is within the range of 00 to 23. As to the other kinds of the time information, the time information determination unit 308 performs this range check.

In a case where the values of all kinds of the time information are within the normal range, the time information determination unit 308 determines that correct time information has been collected in all the memories of the time information collection unit 306 (step S59: YES), and advances the value of "minute" by 1 (adds 1 to the value set in the minute memory 306*a*). At the same time, time correction depending on the reception area where the time calibration signal is received, and time correction by the received summer time flag (adding 1 hour if it is during a summer time period) are performed. In order to perform the time correction depending on the reception area, the hour to which time is corrected may be designated, but instead, an area number may be designated and converted into a time difference with respect to the Greenwich mean time corresponding to the area number (−5 hours in case of the Eastern Standard Time, −6 hours in case of the Central Standard Time, −7 hours in case of the Mountain Standard Time, and −8 hours in case of the Pacific Standard Time). Further, the time information determination unit 308 obtains "month", "day", and "day of the week" from the value of "year" stored in the time information collection unit 306 and the three-digit serial number made up by combining the value set in the serial day number memory 306*e* (the upper two digits of "serial day number") and the value set in the serial day number memory 306*f* (the last one digit of "serial day number"). Then, by using the obtained values of "month", "day", and "day of the week" and the values set in the memories of "year", "hour", and "minute" of the time information collection unit 306, the time information determination unit 308 corrects the corresponding values in the timekeeping counter of the timekeeping unit 310 (step S60). Then, the time information determination unit 308 resets the value of "second" in the timekeeping counter of the timekeeping unit 310 to 00 second, at the timing of modification of "leap second" to notification of a frame start timing output from the block determination unit 304.

When correction of time is completed, the time information determination unit 308 notifies the completion to the reception managing unit 305. When receiving the notification, the reception managing unit 305 stops the reception operation of the reception circuit 302 to finish receiving the time calibration signal, and returns to the waiting state to wait for the reception time to come (step S51).

In a case where determining that correct time information is not collected in all the memories of the time information collection unit 306 as a result of determining the time information (step S59: NO), the time information determination unit 308 temporarily stores only the time information of the kinds which are determined as correct in the temporary storage unit 307 (step S61). When the temporary storage of the time information in the temporary storage unit 307 is performed, the time information modification unit 309 advances the time information set in the temporary storage unit 307 (step S62). After the time information is advanced, the time information modification unit 309 stores each kind of the time information in the time information collection unit 306 by using the data stored in the temporary storage unit 307 (modification (interpolation) of the time information) (step S63).

When modification of the time information is completed, the flow returns to step S54, and the above-described processes will be performed for a frame newly received.

Even if correct time information is not collected in all the memories of the time information collection unit 306 by reception of one frame, by repeating the processes of code extraction (step S54) to time information determination (step S59) and the processes of temporary storage (step S61) to time information modification (step S63) until correct time information is collected in all the memories of the time information collection unit 306, it is possible to obtain all kinds of the time information that are received correctly.

FOURTH EMBODIMENT

In the fourth embodiment, a radio wave clock which receives and processes a time calibration signal on which a time code having a different format from that of the time code of the second embodiment is embedded, and which corresponds to the second embodiment will be explained. The time calibration signal according to the present embodiment contains data of minute, hour, serial day number, year, leap second, etc.

Figure 7:
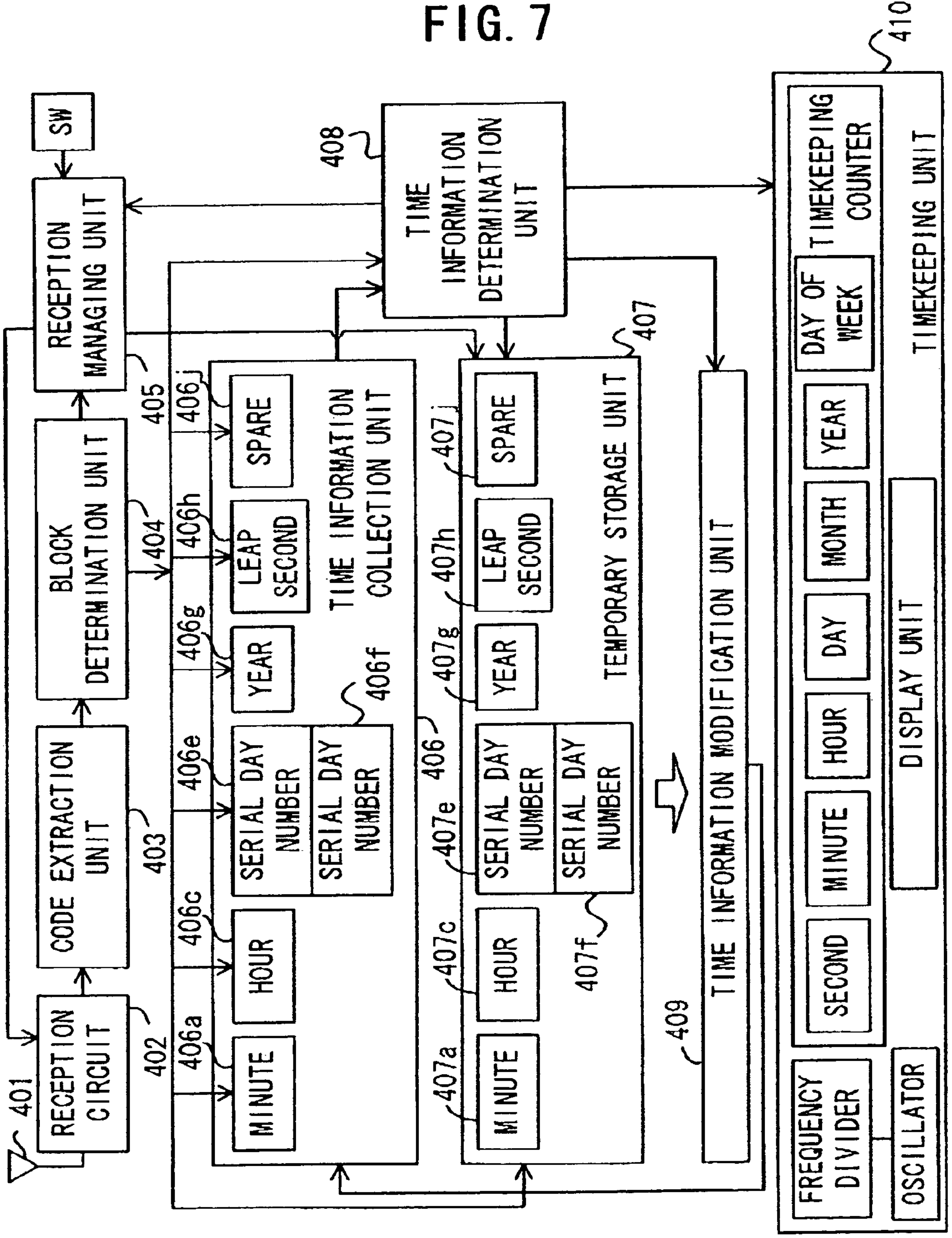
FIG. 7 is a diagram showing an example of configuration of a radio wave correction clock according to a fourth embodiment of the present invention.

FIG. 7 is a block diagram showing the main configuration of a radio wave correction clock according to the fourth embodiment of the present invention. The antenna 401, the reception circuit 402, the code extraction unit 403, the block determination unit 404, the reception managing unit 405, the time information collection unit 406, the temporary storage unit 407, the time information determination unit 408, the time information modification unit 409, and the timekeeping unit 410 of the radio wave correction clock according to the present embodiment have the same function and configuration as those in the second embodiment, except the differences to be described below.

The block determination unit 404 detects markers indicating the start of one frame from time codes extracted by the code extraction unit 403, and converts binary codes into time information of “minute”, “hour”, “serial day number”, “year”, “leap second”, etc. based on a format which is set to the time calibration signal. The time information collection unit 406 and the temporary storage unit 407 collect and save (store) time information output from the block determination unit 404, separately by each kind of time information (“minute”, “hour”, “serial day number”, “year”, “leap second”, etc.). According to the present embodiment, data of minute parity and hour parity are not received. Therefore, the time information determination unit 408 does not perform error detection using minute parity and hour parity.

Figure 8:
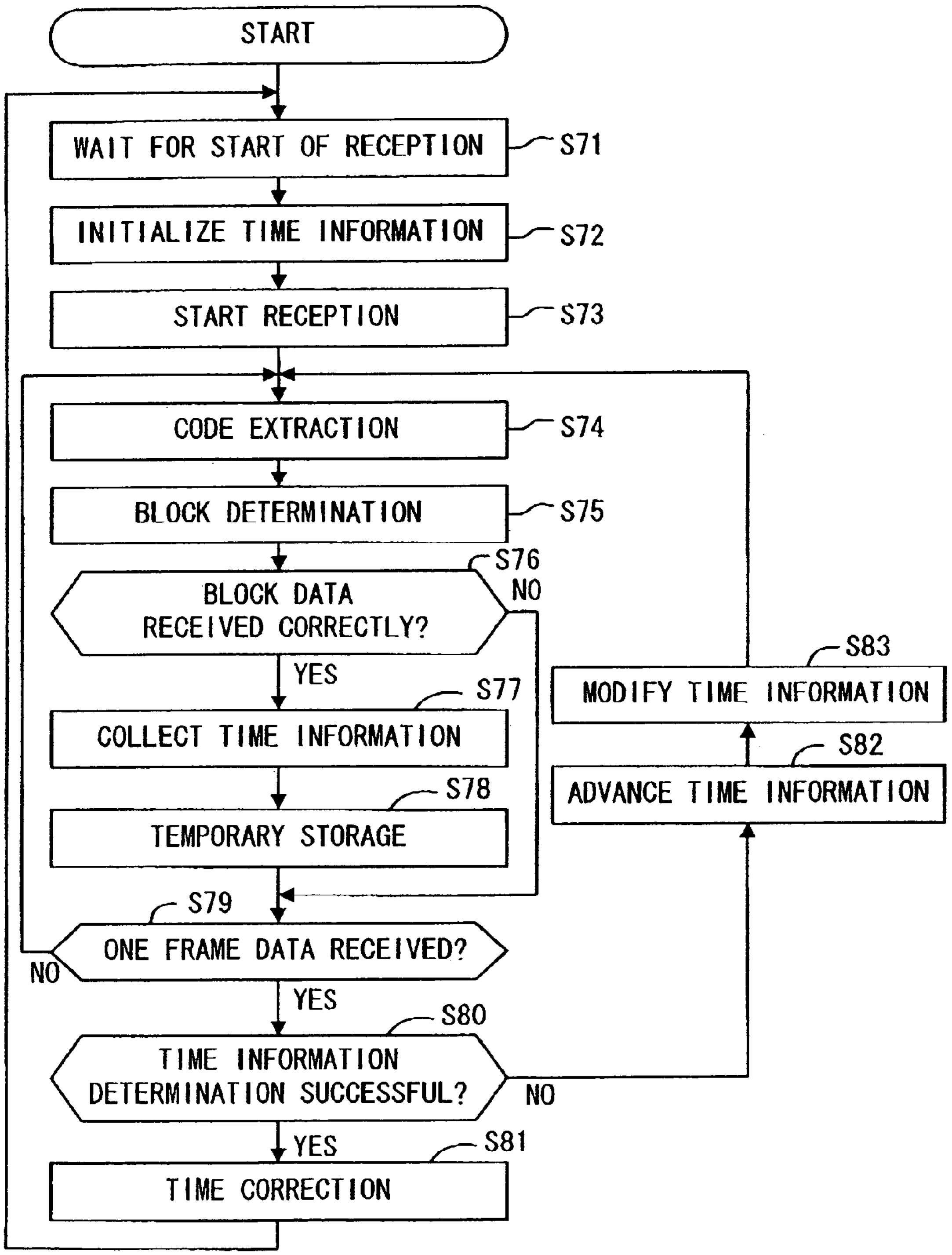
FIG. 8 is a flowchart for explaining a time correction process performed by the radio wave correction clock shown in FIG. 7.

Next, with reference to a flowchart shown in FIG. 8, a time correction process performed by the radio wave correction clock according to the fourth embodiment of the present invention will be specifically explained.

The reception managing unit 405 waits until a preset reception time comes or a depression of a correction switch SW is detected, in a time calibration signal reception start waiting state (step S71).

When the preset reception time comes or a depression of the correction switch SW is detected, the reception managing unit 405 initializes the time information (step S72), and starts receiving a time calibration signal (step S73). When reception of the time calibration signal is started in step S73, the reception circuit 402 amplifies the time calibration signal received by the antenna 401, detects a rectangular pulse having a unit of one frame per minute and representing one bit by 1 Hz, and outputs the detected rectangular pulse to the code extraction unit 403. The code extraction unit 403 detects the pulse width of the detected rectangular pulse. The code extraction unit 403 extracts a time code by determining that the rectangular pulse is a binary code of “1” if the pulse width is 500 ms±100 ms (i.e., 400 ms to 600 ms), determining that the rectangular pulse is a binary code of “0” if the pulse width is 200 ms±100 ms (i.e., 100 ms to 300 ms), and determining that the rectangular pulse is a frame reference or a position marker if the pulse width is 800 ms±100 ms (i.e., 700 ms to 900 ms) (step S74).

When time codes such as binary codes, markers, etc. are input from the code extraction unit 403, the block determination unit 404 detects a frame start timing, converts the binary codes into time information such as “minute”, “hour”, “serial day number”, “year”, “leap second”, a condition flag (indicating summer time, forenotice for leap year and leap second), etc. based on a format of time code information set to the time calibration signal, and starts block determination for determining whether or not the block data has been received correctly by determining whether the conversion result is correct (step S75). This block determination includes determination of whether the time information obtained based on the format of time code information set to the time calibration signal is correct formally, check of the range of the value of the time information (logic check), etc. The specific contents of these checks are the same as those in the second embodiment. In a case where error is detected in any checks performed for the respective kinds of the time information, the block determination unit 404 determines that the block data of the time information has not been received correctly, and discards the time information.

In a case where determining that the block data has been received correctly (step S76: YES), the block determination unit 404 collects (writes) the time information in the memories 406*a* to 406*j* prepared for the respective kinds of the time information in the time information collection unit 406 (step S77), and temporarily stores (writes) the time information in the memories 407*a* to 407*j* prepared for the respective kinds of the time information in the temporary storage unit 407 (step S78). For example, in the time information collection unit 406, the block determination unit 404 stores the time information of “minute” in the minute memory 406*a*, the time information of “hour” in the hour memory 406*c*, the time information of the upper two digits of “serial day number” in the serial day number memory 406*e*, the time information of the last one digit of “serial day number” in the serial day number memory 406*f*, the time information of “year” in the year memory 406*g*, the time information of “leap second” in the leap second memory 406*h*, and condition flags indicating summer time and forenotice for leap year and leap second in the spare memory 406*j*. Likewise in the temporary storage unit 407, the block determination unit 404 stores the respective kinds of the time information in the corresponding memories 407*a* to 407*j*.

In a case where it is determined in step S76 that the block data results in reception error or after the time information is stored in the temporary storage unit 407 in step S78, the block determination unit 404 determines whether reception of data for one frame has been completed or not (step S79). Specifically, the block determination unit 404 acquires a summer time flag represented by the fifty-eighth pulse of the received frame and determines whether this summer time flag has been received correctly by checking any loss in the binary code. In a case where the summer time flag has been received correctly, the block determination unit 404 stores the summer time flag in the time information collection unit 406 and the temporary storage unit 407. When the storage is completed, the block determination unit 404 determines that reception of data for one frame has been completed. In a case where reception of data for one frame has not been completed (step S79: NO), the flow returns to step S74. In a case where reception of data for one frame has been completed (step S79: YES), the block determination unit 404 outputs a determination request for determining the time information to the time information determination unit 408.

When the determination request for determining the time information is input from the block determination unit 404, the time information determination unit 408 performs determination of the time information (step S80). In this determination of the time information, the time information determination unit 408 determines whether correct time information is collected in all of the memories 406*a* to 406*j* of the time information collection unit 406. At this time, the time information determination unit 408 may also perform the check of whether the value of a three-digit serial day number made up by combining the value set in the serial day number memory 406*e* (the upper two digits of “serial day number”) and the value set in the serial day number memory 406*f* (the last one digit of “serial day number”) is within the range of 1 to 366. In a case where determining that correct time information is collected in all the memories of the time information collection unit 406 (step S80: YES), the time information determination unit 408 advances the value of “minute” by 1 (adds 1 to the value set in the minute memory 406*a*). At the same time, time correction depending on the reception area where the time calibration signal is received, and time correction by the received summer time flag (adding 1 hour if it is during a summer time period) are performed. In order to perform the time correction depending on the reception area, the hour to which time is corrected may be designated, but instead, an area number may be designated and converted into a time difference with respect to the Greenwich mean time corresponding to the area number (−5 hours in case of the Eastern Standard Time, −6 hours in case of the Central Standard Time, −7 hours in case of the Mountain Standard Time, and −8 hours in case of the Pacific Standard Time). Further, the time information determination unit 408 calculates “month” and “day” from the value of “year” stored in the time information collection unit 406 and the three-digit serial day number. By using the calculated values of “month” and “day” and the values set in the memories of “year”, “hour”, and “minute” in the time information collection unit 406, the time information determination unit 408 corrects the corresponding values in the timekeeping counter of the timekeeping unit 410 (step S81). Then, the time information determination unit 408 resets the value of “second” in the timekeeping counter of the timekeeping unit 410 to 00 second, at the timing of modification of “leap second” to notification of a frame start timing output from the block determination unit 404. As a result, time kept by the timekeeping unit 410 is corrected to time represented by the time calibration signal.

When correction of time is completed, the time information collection unit 408 notifies the completion to the reception managing unit 405. When receiving the notification, the reception managing unit 405 stops the receiving operation of the reception circuit 402 to finish receiving the time calibration signal, and returns to the waiting state to wait for the reception time to come (step S71).

In a case where determining that correct time information is not collected in all the memories of the time information collection unit 406 (step S80: NO), the time information determination unit 408 notifies this to the time information modification unit 409. The time information modification unit 409 advances the time information set in the temporary storage unit 407 (step S82).

After advancing the time information, the time information modification unit 409 stores the data stored in the temporary storage unit 407 in the time information collection unit 406 (modification (interpolation) of the time information) (step S83). Specifically, the time information modification unit 409 stores the time information stored in the memories 407*a* to 407*j* of the temporary storage unit 407 in the memories 406*a* to 406*j* of the time information collection unit 406.

When modification of the time information is completed, the flow returns to step S74, so that the above-described processes will be performed for the frame newly received.

Even if correct time information is not collected in all the memories of the time information collection unit 406 by reception of one frame, by repeating the processes of code extraction (step S74) to time information determination (step S80) and the processes of time information advancement (step S82) to time information modification (step S83) until correct time information is collected in all the memories of time information correction unit 406, it is possible to obtain all kinds of the time information that are received correctly.

FIFTH EMBODIMENT

In the fifth embodiment, a radio wave clock which receives and processes a time calibration signal on which a time code having a different format from that of the time code of the first embodiment is embedded, and which corresponds to the first embodiment will be explained. The time calibration signal according to the present embodiment contains data of minute, hour, day, day of the week, month, year, hour parity, minute parity, calendar parity, conditions flags related to summer time and insertion of leap second, etc.

Figure 9:
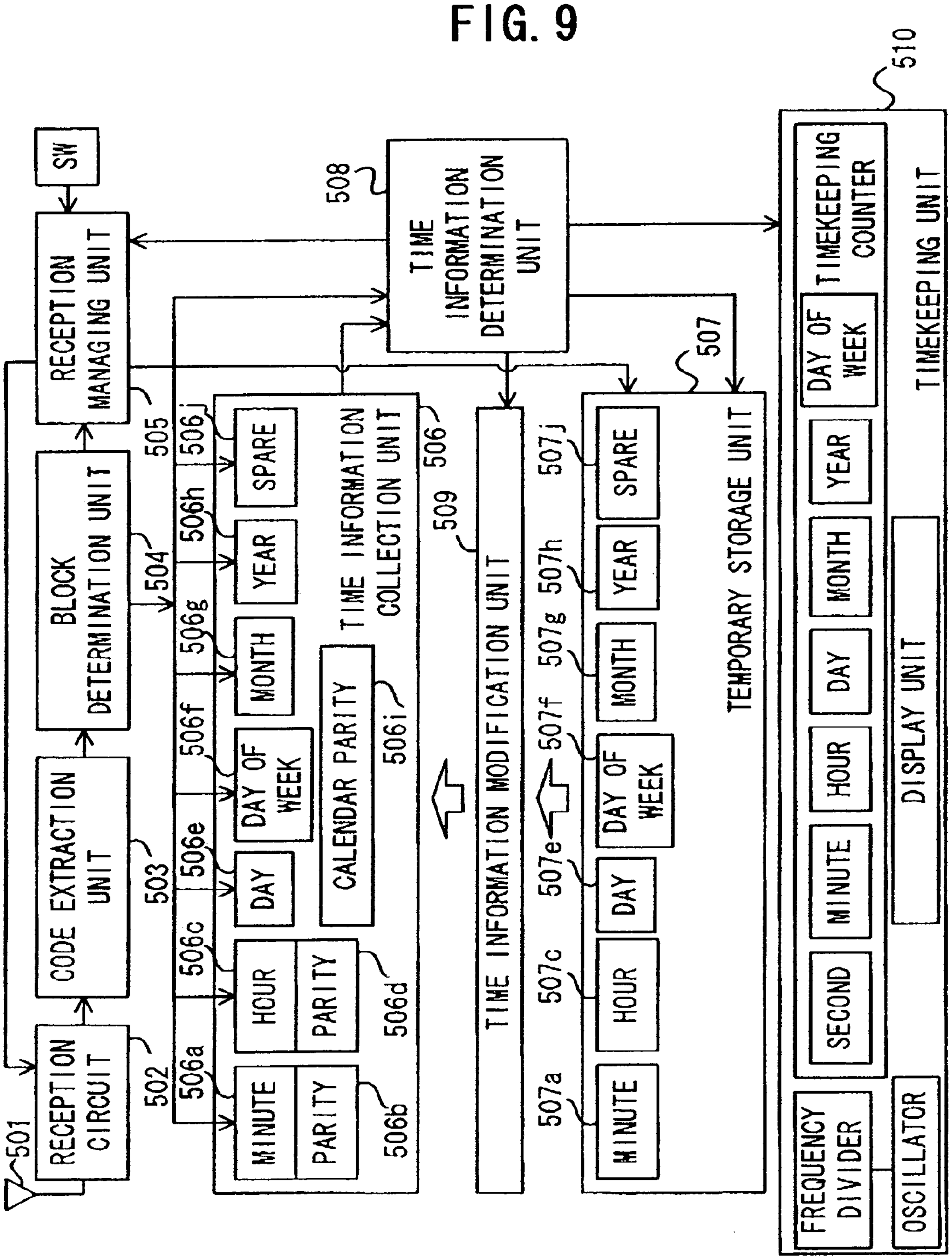
FIG. 9 is a diagram showing an example of configuration of a radio wave correction clock according to a fifth embodiment of the present invention.

FIG. 9 is a block diagram showing the main configuration of a radio wave correction clock according to the fifth embodiment of the present invention. The antenna 501, the reception circuit 502, the code extraction unit 503, the block determination unit 504, the reception managing unit 505, the time information collection unit 506, the temporary storage unit 507, the time information determination unit 508, the time information modification unit 509, and the timekeeping unit 510 of the radio wave correction clock according to the present embodiment have the same function and configuration as those in the first embodiment, except the differences to be described below.

The block determination unit 504 detects markers indicating the start of one frame from time codes extracted by the code extraction unit 503, and obtains time information of “minute”, “hour”, “day”, “day of the week”, “month”, “year”, etc. from binary codes based on a format set to the time calibration signal. The time information collection unit 506 collects and saves (stores) the time information (“minute”, “hour”, “day”, “day of the week”, “month”, “year”, etc.) output from the block determination unit 504, and parity bits, etc., separately by each kind of the time information. The temporary storage unit 507 saves (stores) time information (“minute”, “hour”, “day”, “day of the week”, “month”, “year”, etc.) and parity bits which are determined as correct by the time information determination unit 508, separately by each kind of the time information. According to the present embodiment, a frame contains a calendar parity. Therefore, the time information determination unit 508 performs error detection by using the calendar parity.

Figure 10:
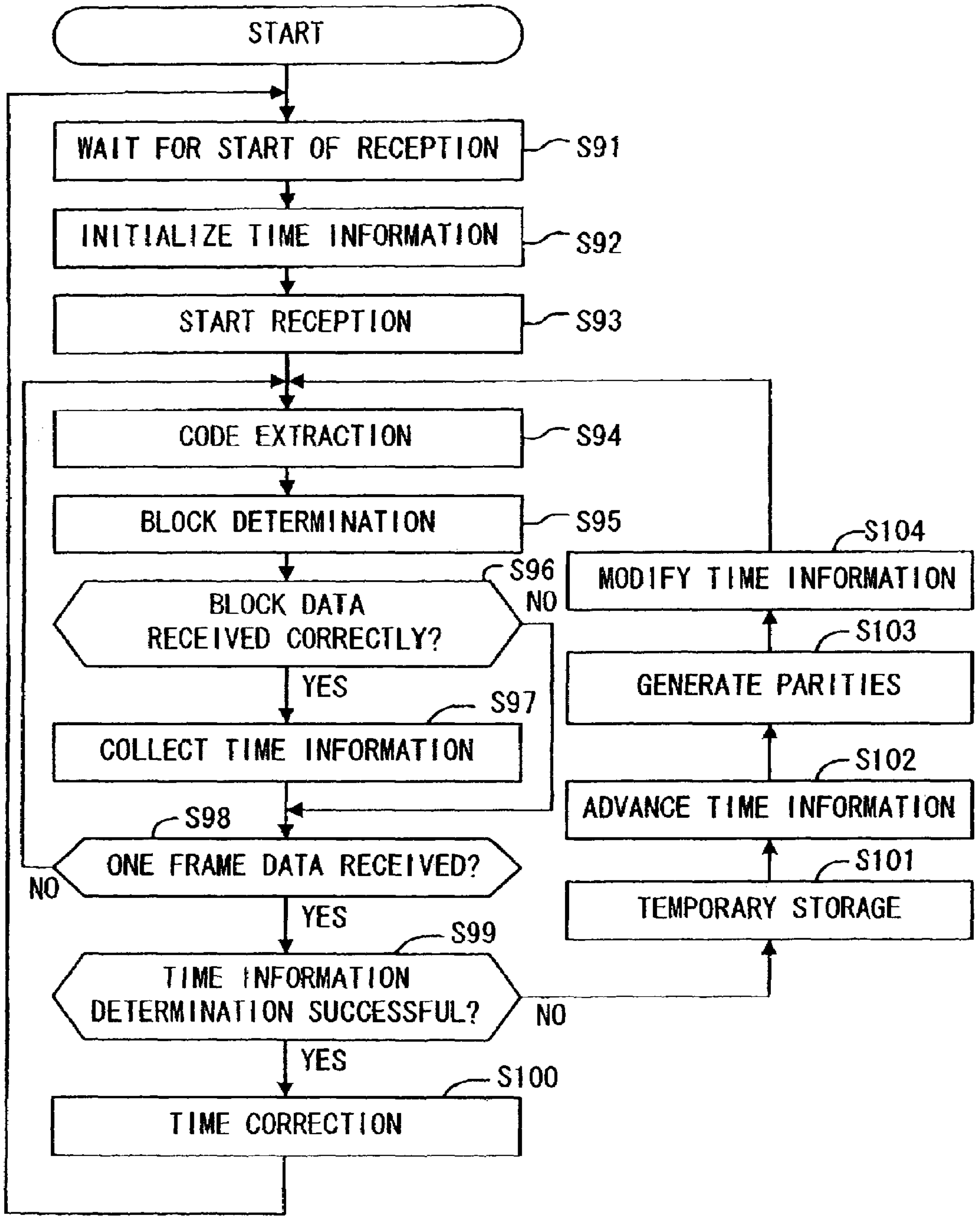
FIG. 10 is a flowchart for explaining a time correction process performed by the radio wave correction clock shown in FIG. 9.

Next, with reference to a flowchart shown in FIG. 10, a time correction process performed by the radio wave correction clock according to the fifth embodiment of the present invention will specifically be explained.

The reception managing unit 505 waits until a preset reception time comes or a depression of a correction switch SW is detected, in a time calibration signal reception start waiting state (step S91).

When the reception time comes or a depression of the correction switch SW is detected, the reception managing unit 505 initializes the time information (step S92), and starts receiving a time calibration signal (step S93). When reception of the time calibration signal is started in step S93, the reception circuit 502 amplifies the time calibration signal received by the antenna 501, detects a rectangular pulse having a unit of one frame per minute and representing one bit by 1 Hz, and outputs the detected rectangular pulse to the code extraction unit 503. The code extraction unit 503 detects the pulse width of the detected rectangular pulse. The code extraction unit 503 extracts a time code by determining that the rectangular pulse is a binary code of “1” if the pulse width is 200 ms±40 ms (i.e., 160 ms to 240 ms), determining that the rectangular pulse is a binary code of “0” if the pulse width is 100 ms±20 ms (i.e., 80 ms to 120 ms), and determining that the rectangular pulse is a frame marker if a pulse interval is about 2 seconds (1500 ms to 2050 ms) (step S94).

When time codes such as binary codes, markers, etc. are input from the code extraction unit 503, the block determination unit 504 detects a frame start timing indicated by a frame marker, obtains block data (time information) of “minute”, “hour”, “day”, “day of the week”, “month”, “year”, condition flags (related to summer time and insertion of leap second), etc. from the binary codes based on a format of time code information set to the time calibration signal, and starts block determination for determining whether each block data has been received correctly (step S95). Block determination performed in this step is the same as that in the first embodiment.

In a case where determining that the block data has been received correctly (step S96: YES), the block determination unit 504 outputs the time information of the determined block data in the corresponding memory of the time information collection unit 506 (step S97). Specifically, the block determination unit 504 stores the time information of "minute" in the minute memory 506*a*, the time information of "hour" in the hour memory 506*c*, the time information of "day" in the day memory 506*e*, the time information of "day of the week" in the day of week memory 506*f*, the time information of "month" in the month memory 506*g*, the time information of "year" in the year memory 506*h*, and the condition flags in the spare memory 506*j*. The block determination unit 504 stores the minute parity, the hour parity, and the calendar parity in the parity memories 506*b*, 506*d*, and 506*i* respectively.

In a case where it is determined in step S96 that the block data results in reception error or after the time information is collected in step S97, the block determination unit 504 determines whether or not reception of data for one frame has been completed (step S98). Specifically, the block determination unit 504 acquires the calendar parity at the fifty-eight pulse in the received frame and determines whether the calendar parity has been received correctly by checking any loss in the binary code. In a case where the calendar parity has been received correctly, the block determination unit 504 stores the calendar parity in the time information collection unit 506. When the storage is completed, the block determination unit 504 determines that reception of data for one frame has been completed. In a case where reception of data for one frame has not been completed (step S98: NO), the flow returns to step S94. In a case where reception of data for one frame has been completed (step S98: YES), the block determination unit 504 outputs a determination request for determining the time information to the time information determination unit 508.

When the determination request for determining the time information is input from the block determination unit 504, the time information determination unit 508 performs determination of the time information (step S99). In this determination of the time information, the time information determination unit 508 refers to the time information set in each memory of the time information collection unit 506, performs determination of whether the value of each kind of the time information is within a normal range content-wise (whether each kind of the time information is established logically) and performs parity check, to determine whether correct time information has been collected in all the memories of the time information collection unit 506. Specifically, as to the time information of "minute", the time information determination unit 508 performs bit error detection of BCD stored in the minute memory 506*a* and the minute parity stored in the parity memory 506*b*, and checks whether the value set in the minute memory 506*a* is within the range of 00 to 59. As to the time information of "hour", the time information determination unit 508 performs bit error detection of BCD stored in the hour memory 506*c* and the hour parity stored in the parity memory 506*d*, and checks whether the value set in the hour memory 506*c* is within the range of 00 to 23. As to the time information of "day", the time information determination unit 508 checks whether the value set in the day memory 506*e* is within the range of 01 to 31. As to the time information of "month", the time information determination unit 508 checks whether the value set in the month memory 506*g* is within the range of 01 to 12. As to the other kinds of the time information, the time information determination unit 508 performs the value range check. Further, as to the time information of "year" and "day of the week", the time information determination unit 508 performs bit error detection by using all the bits and the calendar parity stored in the parity memory 506*i*. Further, as to the time information of "day", the time information determination unit 508 performs value range check with respect to the range of the maximum number of days in each month, and a special value range check for a case where it is determined from "year" and "month" that the time represented by the time calibration signal is in February of a leap year, if such a case occurs.

In a case where the values of all kinds of the time information are in the normal range, the time information determination unit 508 determines that correct time information is collected in all the memories of the time information collection unit 506 (step S99: YES), and advances the value of "minute" by 1 (adds 1 to the value set in the minute memory 506*a*). Further, by using the values set in the memories of "year", "month", "day", "day of the week", "hour", and "minute" in the time information collection unit 506, the time information determination unit 508 corrects the corresponding values in the timekeeping counter of the timekeeping unit 510 (step S100). The time information determination unit 508 resets the value of "second" in the timekeeping counter of the timekeeping unit 510 to 00 second in response to notification of a frame start timing output from the block determination unit 504.

When correction of time is completed, the time information determination unit 508 notifies the completion to the reception managing unit 505. When receiving the notification, the reception managing unit 505 stops the receiving operation of the reception circuit 502 to finish receiving the time calibration signal, and returns to the waiting state to wait for the reception time to come (step S91).

In a case where determining that correct time information is not collected in all the memories of the time information collection unit 506 as a result of determining the time information (step S99: NO), the time information determination unit 508 stores only the time information that has been received correctly in the temporary storage unit 507 (step S101). When temporary storage in the temporary storage unit 507 is performed, the time information modification unit 509 advances the time information set in the temporary storage unit 507 (step S102).

After the time information is advanced, the time information modification unit 509 generates parity bits for "hour" and "minute" from the advanced time information (step S103). At this time, the time information modification unit 509 also generates a parity bit for calendar based on the BCD codes of "day", "day of the week", "month", and "year". When generation of parity bits is completed, the time information modification unit 509 stores the time information of the respective kinds in the time information collection unit 506, by using the generated parity bits and the data stored in the temporary storage unit 507 (modification of the time information) (step S104).

When modification of the time information is completed, the flow returns to step S94, so that the above-described processes will be performed for a frame newly received.

Even if correct time information is not collected in all the memories of the time information collection unit 506 by reception of one frame, by repeating the processes of code extraction (step S94) to time information determination (step S99) and the processes of temporary storage (step S101) to time information modification (step S104) until correct time information is collected in all the memories of time information correction unit 506, it is possible to obtain all kinds of the time information that are received correctly.

SIXTH EMBODIMENT

In the sixth embodiment, a radio wave clock which receives and processes a time calibration signal on which a time code having a different format from that of the time code of the second embodiment is embedded, and which corresponds to the second embodiment will be explained. The time calibration signal according to the present embodiment contains data of minute, hour, day, day of the week, month, year, hour parity, minute parity, calendar parity, condition flags related to summer time and insertion of leap second, etc.

Figure 11:
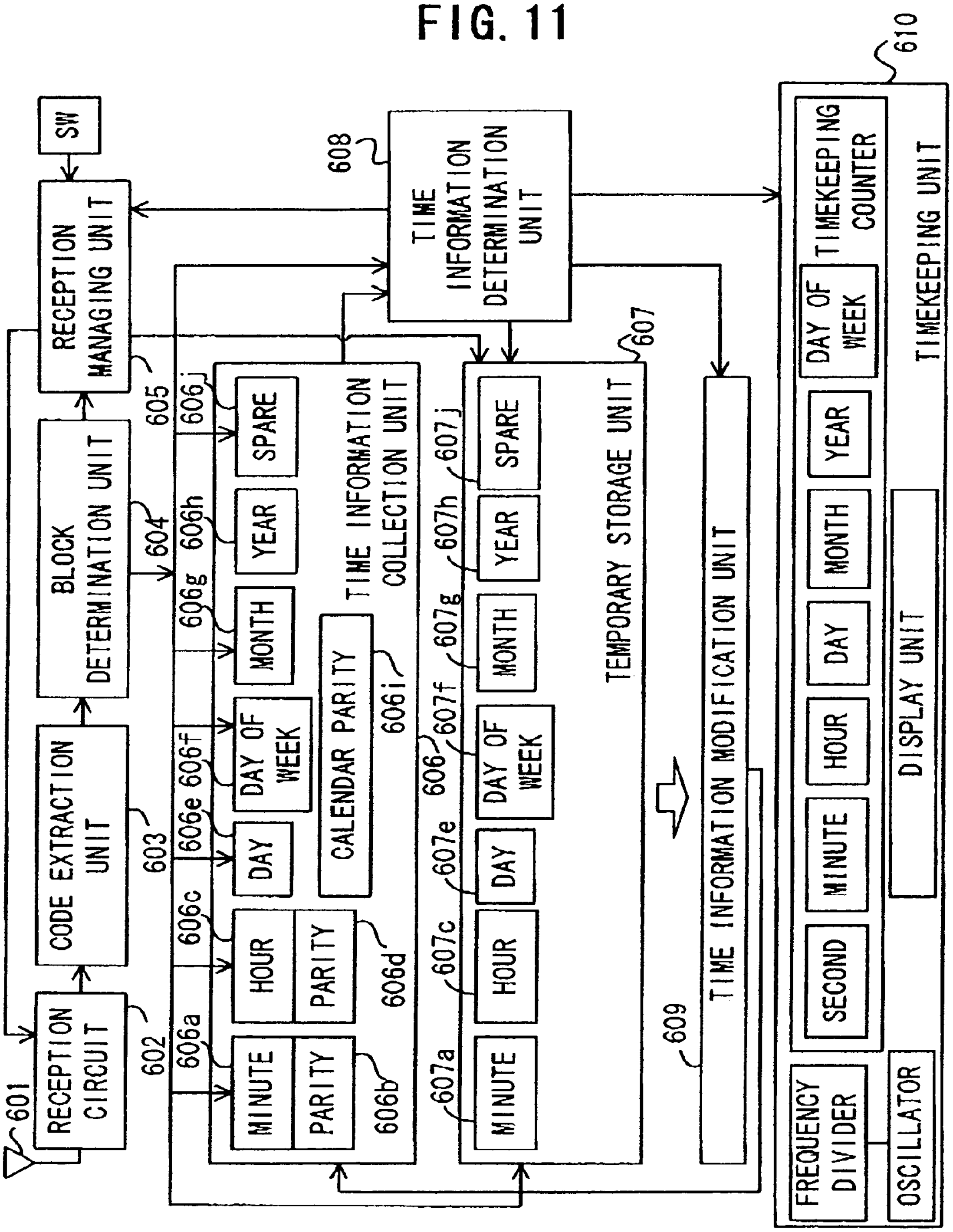
FIG. 11 is a diagram showing an example of configuration of a radio wave correction clock according to a sixth embodiment of the present invention.

FIG. 11 is a block diagram showing the main configuration of a radio wave correction clock according to the sixth embodiment of the present invention. The antenna 601, the reception circuit 602, the code extraction unit 603, the block determination unit 604, the reception managing unit 605, the time information collection unit 606, the temporary storage unit 607, the time information determination unit 608, the time information modification unit 609, and the timekeeping unit 610 of the radio wave correction clock according to the present embodiment have the same function and configuration as those of the second embodiment, except the differences described below.

The block determination unit 604 detects markers indicating the start of one frame from time codes extracted by the code extraction unit 603, and obtains time information of "minute", "hour", "day", "day of the week", "month", "year", "leap second", etc. from binary codes based on a format set to the time calibration signal. The time information collection unit 606 and the temporary storage unit 607 collect and save (store) the time information ("minute", "hour", "day", "day of the week", "month", "year", etc.) and parity bits, etc. which are output from the block determination unit 604, separately by each kind of the time information. According to the present embodiment, a frame contains a calendar parity. Therefore, the time information determination unit 608 performs error detection using the calendar parity.

Figure 12:
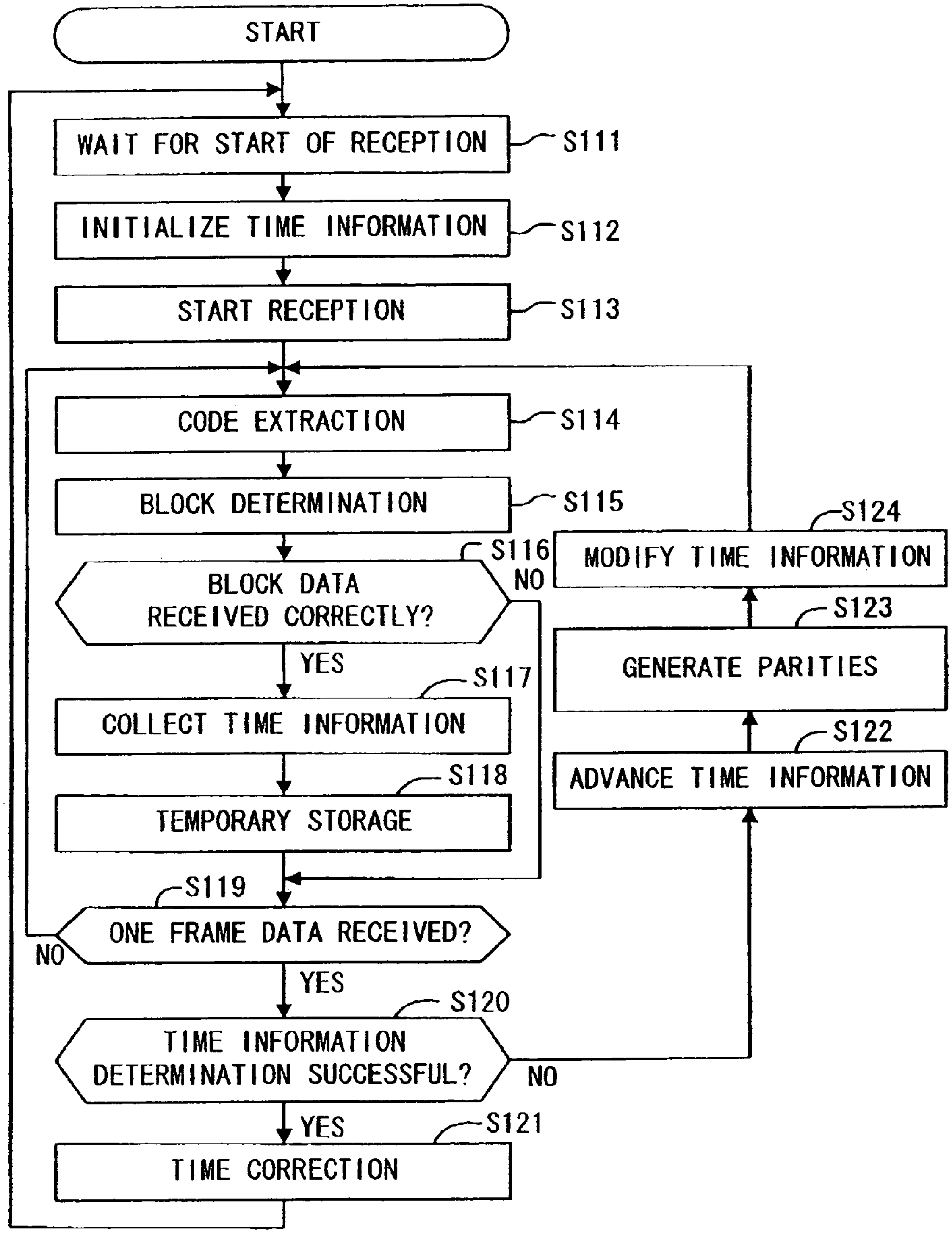
FIG. 12 is a flowchart for explaining a time correction process performed by the radio wave correction clock shown in FIG. 11.

Next, with reference to a flowchart shown in FIG. 12, a time correction process performed by the radio wave correction clock according to the sixth embodiment of the present invention will specifically be explained.

The reception managing unit 605 waits until a preset reception time comes or a depression of a correction switch SW is detected, in a time calibration signal reception start waiting state (step S111).

When the reception time comes or a depression of the correction switch SW is detected, the reception managing unit 605 initializes the time information (step S112), and starts receiving a time calibration signal (step S113). When reception of the time calibration signal is started in step S113, the reception circuit 602 amplifies the time calibration signal received by the antenna 601, detects a rectangular pulse having a unit of one frame per minute and representing one bit by 1 Hz, and outputs the detected rectangular pulse to the code extraction unit 603. The code extraction unit 603 detects the pulse width of the detected rectangular pulse. The code extraction unit 603 extracts a time code by determining that the rectangular pulse is a binary code of "1" if the pulse width is 200 ms±40 ms (i.e., 160 ms to 240 ms), determining that the rectangular pulse is a binary code of "0" if the pulse width is 100 ms±20 ms (i.e., 80 ms to 120 ms), and determining that the rectangular pulse is a frame marker if a pulse interval is about 2 seconds (1500 ms to 2050 ms) (step S114).

When time codes such as binary codes, markers, etc. are input from the code extraction unit 603, the block determination unit 604 detects a frame start timing, obtains time information such as "minute", "hour", "day", "day of the week", "month", "year", condition flags (related to summer time and insertion of "leap second"), etc., and starts block determination for determining whether each block data has been received correctly by determining whether the obtained time information is correct or not by each kind of the time information (step S115). This block determination includes determination of whether the time information obtained based on the format of time code information set to the time calibration signal is correct formally, parity error detection, check of the range of the value of the time information (logic check), etc.

In a case where the block data has been received correctly (step S116: YES), the block determination unit 604 collects (writes) the time information in the memories 606*a* to 606*j* prepared for the respective kinds of the time information in the time information collection unit 606 (step S17), and temporarily stores (writes) the time information in the memories 607*a* to 607*j* prepared for the respective kinds of the time information in the temporary storage unit 607 (step S118). The data of "day", "day of the week", "month", and "year" may be temporarily stored in the temporary storage unit 607 even if these four block data result in parity error, which might be caused since error detection of these data is performed by using only the calendar parity, but if these data are determined as correct in other checks such as value range check (logic check) of the time information. For example, in the time information collection unit 606, the block determination unit 604 stores the time information of "minute" in the minute memory 606*a*, the time information of "hour" in the hour memory 606*c*, the time information of "day" in the day memory 606*e*, the time information of "day of the week" in the day of week memory 606*f*, the time information of "month" in the month memory 606*g*, the time information of "year" in the year memory 606*h*, and the condition flags in the spare memory 606*j*. The block determination unit 604 stores the minute parity, the hour parity, and the calendar parity in the parity memories 606*b*, 606*d*, and 606*i* respectively. Likewise, in the temporary storage unit 607, the block determination unit 604 stores the time information in the corresponding memories 607*a* to 607*j*.

In a case where it is determined in step S116 that the block data results in reception error or after the time information is stored in the temporary storage unit 607 in step S118, the block determination unit 604 determines whether reception of data for one frame has been completed or not (step S119). Specifically, the block determination unit 604 acquires the calendar parity at the fifty-eight pulse of the received frame, and determines whether the calendar parity has been received correctly by checking any loss in the binary code. In a case where the calendar parity has been received correctly, the block determination unit 604 stores the calendar parity in the time information collection unit 606 and the temporary storage unit 607. When the storage is completed, the block determination unit 604 determines that reception of data for one frame has been received. In a case where reception of data for one frame has not been completed (step S119: NO), the flow returns to step S14. In a case where reception of data for one frame has been completed (step S119: YES), the block determination unit 604 outputs a determination request for determining the time information to the time information determination unit 608.

When the determination request for determining the time information is input from the block determination unit 604, the time information determination unit 608 performs determination of the time information (step S120). In this determination of the time information, the time information determination unit 608 determines whether correct time information has been collected in all the memories 606*a* to

606*j* of the time information collection unit 606. The time information determination unit 608 may also perform check using the calendar parity in this determination. In this case, the time information determination unit 608 performs bit error detection by using all the bits in the day memory 606*e*, the day of week memory 606*f*, the month memory 606*g*, and the year memory 606*h* and the calendar parity bit in the parity memory 606*i*. Further, as to the time information of "day", the time information determination unit 608 performs value range check with respect to the range of the maximum number of days in each month, and a special value range check for a case where it is determined from "year" and "month" that the time represented by the time calibration signal is in February of a leap year, if such a case occurs. In a case where the correct time information has been collected in all the memories of the time information collection unit 606 (step S120: YES), the time information determination unit 608 advances the value of "minute" by 1 (adds 1 to the value set in the minute memory 606*a*). Then, by using the set values stored in the memories of "year", "month", "day", "day of the week", "hour", and "minute" in the time information collection unit 606, the time information determination unit 608 corrects the corresponding values in the timekeeping counter of the timekeeping unit 610 (step S121). Then, the time information determination unit 608 resets the value of "second" in the timekeeping counter of the timekeeping unit 610 to 00 second in response to notification of a frame start timing output from the block determination unit 604.

When correction of time is completed, the time information determination unit 608 notifies the completion to the reception managing unit 605. When receiving the notification, the reception managing unit 605 stops the receiving operation of the reception circuit 602 to finish receiving the time calibration signal, and returns to the waiting state to wait for the reception time to come (step S111).

In a case where determining that correct time information has not been collected in all the memories of the time information collection unit 606 (step S120: NO), the time information determination unit 608 notifies this to the time information modification unit 609. The time information modification unit 609 advances the time information set in the temporary storage unit 607 (step S122).

After advancing the time information, the time information modification unit 609 generates parity bits for "hour" and "minute" from the advanced time information (step S123). At this time, the time information modification unit 609 also generates a parity bit for calendar based on the BCD codes of "day", "day of the week", "month", and "year". When generation of parity bits is completed, the time information modification unit 609 stores the time information of the respective kinds in the time information collection unit 606 by using the generated parity bits and the data stored in the temporary storage unit 607 (modification (interpolation) of the time information) (step S1124). When modification of the time information is completed, the flow returns to step S114, so that the above-described processes will be performed for a frame newly received.

Therefore, even if correct time information is not collected in all the memories of the time information collection unit 606 by reception of one frame, by repeating the processes of code extraction (step S114) to time information determination (step S120) and the processes of time information advancement (step S122) to time information modification (step S124) until correct time information is collected in all the memories of time information correction unit 606, it is possible to obtain all kinds of the time information that are received correctly.

In steps S36, S76 and S116 in the second, fourth, and sixth embodiments, block determination including determination of whether the time information obtained based on the format of time code information set to the time calibration signal is correct formally, parity error detection, and value range check of the time information is performed, and thereafter, collection of the time information (steps S37, S77, S117) and temporary storage of the time information (step S38, S78, S118) are performed. However, the present invention is not limited to this. For example, determination of whether the time information obtained based on the format of time code information set to the time calibration signal is correct formally may be performed in the block determination of steps S36, S76, and S116, and in a case where it is determined in these steps that the time information is correct formally, the time information may be collected in the time information collection unit in steps S37, S77, and S117 and may be temporarily stored in the temporary storage unit in steps S38, S78, and S118, and thereafter, parity error detection and value range check (logic check) of the time information collected in the time information collection unit and determination of whether correct time information has been collected in all the memories of the time information collection unit may be performed in steps S40, S80, and S120.

Or, for example, the block determination unit may determine whether the time information obtained based on the format of time code information set to the time calibration signal is correct formally in the block determination of steps S36, S76, and S116, and in a case where determining that the time information is correct formally, the block determination unit may store the time information in the time information collection unit in steps S37, S77, and S117. Then, the block determination unit (or the time information determination unit) may perform parity error detection and value range check of the time information stored in the time information collection unit. In a case where these checks result in success, the time information may be temporarily stored in the temporary storage unit in steps S38, S78, and S118.

As explained above, according to the present invention, even in a place where there are many noise interferences or in an environment where a time calibration signal is hard to receive, it is possible to perform determination of reception condition of the time information, and thus to easily realize time correction using a time calibration signal. Further, since time can be corrected as requested by the latest time information, accurate time correction can be realized.

In the first to sixth embodiments, the time managing unit may be configured to determine that it is impossible to receive any further data of the time calibration signal in a case where correct time information has not been collected in all the memories even when a predetermined time (for example, 20 minutes) elapses after reception of the time calibration signal was started, and thus to forcibly stop receiving the time calibration signal. In this case, it is possible to suppress the amount of power consumed by the radio wave correction clock.

In each of the above-described embodiments, the radio wave correction clock is designed so as to finish its operation by correcting the timekeeping unit when reception of correct time information in all the memories results in success. However, the target time information for which it is determined whether reception results in success may be narrowed to, for example, "hour" and "minute, or "year", "serial day number", "hour", and "minute", etc., according to necessity.

In each of the above-described embodiments, determination of whether received data is correct time information may be performed in block determination, and in determination of the time information to be performed after block determination, determination of whether all kinds of necessary time information have been collected may only be performed.

In each of the above-described embodiments, the radio wave correction clock is designed so as to finish its operation by correcting the timekeeping unit when time information for one frame has been received successfully (when one set of time information is collected). However, the present invention is not limited to this. For example, reception of the time calibration signal may be continued until a plurality of frames (for example, three frames) are collected (until plural sets of time information are collected) to determine whether all the received frames (all the received sets) contain time information that is along the actual time line, and thereafter the timekeeping unit may be corrected by using the time information of the lastly received frame (the set of time information collected last). In this case, when one set of time information is collected, the time information determination unit notifies this to the reception managing unit, so that the receiving operation is newly started for the next set. In this case, in order that each set of time information may be identified, the block determination unit and the time information determination unit may count for what ordinal number of time information set the receiving operation is performed, and the received data may be stored in the memories of the time information collection unit and temporary storage unit in association with the counted value (n-th set). Then, the time information determination unit may determine whether a predetermined number of time information sets have been collected, and when collected, may correct the timekeeping counter of the timekeeping unit based on the time information of the lastly received set. For example, in a case where the frame received first represents 03 year, January, 1st day, 5 o'clock, 5 minutes, the frame received second represents 03 year, January, 1st day, 5 o'clock, 6 minutes, and the frame received third does not contain all kinds of time information by the first reception and lacking kinds of time information are all collected when frame reception is performed three times thereby altogether representing 03 year, January, 1 st day, 5 o'clock, 9 minutes, these sets of time information are determined to be along the time flow. Further, in a case where a plurality of frames (for example, five frames) are received and a predetermined number of frames (for example, three frames) out of them contain time information that are along the time flow, the timekeeping unit may be corrected based on the predetermined number of time information sets. The confirmation of whether the time information represented by each frame is along the time line may be performed by advancing the time information of a successfully received frame by one minute when reception of the next frame is started, and comparing the advanced time information with the time information of this next frame.

The "clock" in the present specification is not limited to the so-called "clock" having a timekeeping function and a time indicating function. The "radio wave correction clock" in the present specification widely includes a wristwatch, a bracket clock, a time recorder, a timestamp, a computer, a POS (Point Of Sales) terminal, etc. which have a function for receiving a time calibration signal (standard time and frequency signal) and correcting the kept time, and apparatuses (for example, a monitor apparatus used for various meters such as a gas meter, a power meter, etc.) and devices (including an IC (Integration Chip) and an IC tag) which have a timekeeping function but no time indicating function.

A case where the time calibration signal is a long wave standard time and frequency signal has been mainly explained. However, the frequency and the modulation method of the time calibration signal, and the kind of the transmitting station of the time calibration signal are arbitrary. For example, the frequency may be a high frequency (a short wave standard time and frequency signal may be received). The present invention can be applied to an apparatus which receives a time signal from a GPS (Global Positioning System) and corrects its kept time based on this time signal.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-318704 filed on Sep. 10, 2003 and including specification, claims, drawings and summary. The disclosure of the above Japanese Patent Application is incorporated herein by reference in its entirety.

What is claimed is:

1. A radio wave correction clock comprising:

a timekeeping unit which includes a timekeeping counter;

a reception unit which receives a time calibration signal;

a designating unit which designates time correction corresponding to a reception area where the time calibration signal is received;

first and second storage units which store time information;

an extraction unit which extracts various kinds of time information from the time calibration signal received by said reception unit;

a first determination unit which determines whether the time information extracted by said extraction unit is correct or not by each of the various kinds of the time information, and stores time information which is determined as correct in said first storage unit;

a second determination unit which performs logic check of each of the various kinds of the time information stored in said first storage unit to determine whether correct information is collected for all of the various kinds of the time information in said first storage unit, and stores correct time information out of the various kinds of the time information stored in said first storage unit in said second storage unit, in a case where said second determination unit determines that correct information is not collected for all of the various kinds of the time information;

a modification unit which modifies the time information stored in said first storage unit based on the time information stored in said second storage unit; and a correction unit which corrects said timekeeping counter of said timekeeping unit based on the various kinds of the time information stored in said first storage unit and designation of time correction corresponding to the reception area, in a case where said second determination unit determines that correct information is collected for all of the various kinds of the time information, wherein in response to each extraction of the various kind of time information by said extraction unit, said first determination unit performs its determination concerning all of the various kind of time information and storing the time information determined as correct in said first storage unit, and then said second determination unit performs its determination with latest time information concerning all of the various kind of time information in said first storage unit and storing time information in said second storage unit, and then said modification unit modifies said time information stored in said first storage unit, until said second determination unit determines that correct information is collected for all of the various kind of time information, repeatedly.

2. The radio wave correction clock according to claim 1, wherein:

the various kinds of the time information extracted by said extraction unit include data of minute, hour, serial day number, year, and leap second; and said first determination unit performs determination of whether the time information is correct or not as to time information of minute, hour, serial day number, year, and leap second.

3. The radio wave correction clock according to claim 1, wherein:

the various kinds of the time information extracted by said extraction unit include data of minute and hour; and said first determination unit performs determination of whether the time information is correct or not as to time information of minute and hour.

4. The radio wave correction clock according to claim 1, wherein said second determination unit determines whether plural sets of time information have been collected, and corrects said timekeeping counter of said timekeeping unit based on a set of time information which is collected last in a case where determining that plural sets of time information have been collected.

5. A radio wave correction clock comprising:

a timekeeping unit which includes a timekeeping counter;

a reception unit which receives a time calibration signal;

a designating unit which designates time correction corresponding to a reception area where the time calibration signal is received;

first and second storage units which store time information;

an extraction unit which extracts various kinds of time information from the time calibration signal received by said reception unit;

a first determination unit which determines whether the time information extracted by said extraction unit is correct or not by each of the various kinds of the time information, and stores time information which is determined as correct in said first and second storage units;

a second determination unit which determines whether correct information is collected for all of the various kinds of the time information stored in said first storage unit;

a modification unit which modifies the time information stored in said first storage unit based on the time information stored in said second storage unit, in a case where said second determination unit determines that correct information is not collected for all of the various kinds of the time information; and a correction unit which corrects said timekeeping counter of said timekeeping unit based on the various kinds of the time information stored in said first storage unit and designation of time correction corresponding to the reception area, in a case where said second determination unit determines that correct information is collected for all of the various kinds of the time information, wherein in response to each extraction of the various kind of time information by said extraction unit, said first determination unit performs its determination concerning all of the various kind of time information and storing the time information determined as correct in said first and second storage units, and then said second determination unit performs its determination with latest time information concerning all of the various kind of time information in said first storage unit and said modification unit modifies said time information stored in said first storage unit based on the time information stored in said second storage unit, until said second determination unit determines that correct information is collected for all of the various kind of time information, repeatedly.

6. The radio wave correction clock according to claim 5, wherein:

the various kinds of the time information extracted by said extraction unit include data of minute, hour, serial day number, year, and leap second; and said first determination unit performs determination of whether the time information is correct or not as to time information of minute, hour, serial day number, year, and leap second.

7. The radio wave correction clock according to claim 5, wherein:

the various kinds of the time information extracted by said extraction unit include data of minute and hour; and said first determination unit performs determination of whether the time information is correct or not as to time information of minute and hour.

8. The radio wave correction clock according to claim 5, wherein said second determination unit determines whether plural sets of time information have been collected, and corrects said timekeeping counter of said timekeeping unit based on a set of time information which is collected last in a case where determining that plural sets of time information have been collected.

* * * * *